United States Patent
Sung et al.

(10) Patent No.: US 11,248,505 B2
(45) Date of Patent: Feb. 15, 2022

(54) PALLADIUM DIESEL OXIDATION CATALYST

(71) Applicant: BASF Corporation, Florham Park, NJ (US)

(72) Inventors: Shiang Sung, New York, NY (US); Patrick William McCanty, Caldwell, NJ (US); Markus Koegel, Roemerberg (DE); Susanne Stiebels, Adenbuettel (DE)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/310,327

(22) PCT Filed: Jun. 13, 2017

(86) PCT No.: PCT/IB2017/053514
§ 371 (c)(1),
(2) Date: Dec. 14, 2018

(87) PCT Pub. No.: WO2017/216728
PCT Pub. Date: Dec. 21, 2017

(65) Prior Publication Data
US 2019/0331013 A1    Oct. 31, 2019

Related U.S. Application Data

(60) Provisional application No. 62/351,657, filed on Jun. 17, 2016.

(51) Int. Cl.
*B01J 21/04*    (2006.01)
*B01J 21/06*    (2006.01)
(Continued)

(52) U.S. Cl.
CPC .............. *F01N 3/103* (2013.01); *B01J 23/02* (2013.01); *B01J 23/42* (2013.01); *B01J 23/44* (2013.01);
(Continued)

(58) Field of Classification Search
CPC ........ B01J 21/04; B01J 21/063; B01J 21/066; B01J 21/10; B01J 23/02; B01J 23/10;
(Continued)

(56) References Cited

U.S. PATENT DOCUMENTS

| 6,677,264 B1 | 1/2004 | Klein et al. |
| 7,947,238 B2 * | 5/2011 | Deeba ...................... B01J 35/04 423/213.2 |

(Continued)

FOREIGN PATENT DOCUMENTS

| CN | 102869442 A | 1/2013 |
| CN | 103945936 A | 7/2014 |

(Continued)

OTHER PUBLICATIONS

International Preliminary Report on Patentability for counterpart International Patent Application No. PCT/IB2017/053514, dated Dec. 18, 2018, 12 pages.

(Continued)

*Primary Examiner* — Cam N. Nguyen
(74) *Attorney, Agent, or Firm* — Vincent Sica

(57) ABSTRACT

An oxidation catalyst composite for abatement of exhaust gas emissions from a lean burn engine is provided, the catalyst composite including a carrier substrate having a length, an inlet end and an outlet end, and an oxidation catalyst material coated on the carrier substrate. The oxidation catalyst material can include a first layer and a second layer. The first layer can include a first oxygen storage component that includes ceria and is impregnated with a (Continued)

palladium (Pd) component and a second component including one or more of magnesium (Mg), rhodium (Rh), and platinum (Pt). The second layer can include a refractory metal oxide component impregnated with platinum (Pt) and palladium (Pd), wherein the ratio of Pt to Pd is in the range of about 0:10 to about 10:0.

30 Claims, 15 Drawing Sheets

(51) Int. Cl.
| | |
|---|---|
| *B01J 21/10* | (2006.01) |
| *B01J 23/02* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/63* | (2006.01) |
| *B01J 35/00* | (2006.01) |
| *B01J 35/04* | (2006.01) |
| *F01N 3/10* | (2006.01) |
| *F01N 3/20* | (2006.01) |
| *B01J 37/02* | (2006.01) |

(52) U.S. Cl.
CPC ............. *B01J 23/464* (2013.01); *B01J 23/63* (2013.01); *B01J 35/0006* (2013.01); *B01J 37/0242* (2013.01); *B01J 37/0244* (2013.01); *F01N 3/2066* (2013.01); *F01N 2330/34* (2013.01); *F01N 2510/0684* (2013.01)

(58) Field of Classification Search
CPC ... B01J 23/40; B01J 23/42; B01J 23/44; B01J 23/464; B01J 23/63; B01J 35/0006; B01J 35/04; F01N 3/103; F01N 3/2066
See application file for complete search history.

(56) References Cited

U.S. PATENT DOCUMENTS

| | | | | |
|---|---|---|---|---|
| 8,211,392 B2* | 7/2012 | Grubert | ................ | B01D 53/944 423/213.2 |
| 8,329,607 B2* | 12/2012 | Kazi | ........................ | B01J 29/40 502/66 |
| 8,568,675 B2* | 10/2013 | Deeba | ................... | B01D 53/945 423/213.5 |
| 8,637,426 B2* | 1/2014 | Hoke | ........................ | B01J 23/40 502/339 |
| 8,668,877 B2* | 3/2014 | Wei | ...................... | B01D 53/944 422/177 |
| 8,950,174 B2* | 2/2015 | Hilgendorff | ........... | B01J 35/023 60/299 |
| 9,034,286 B2* | 5/2015 | Bergeal | ................. | B01J 23/005 423/213.5 |
| 9,044,734 B2* | 6/2015 | Grubert | ................ | B01J 37/0244 |
| 9,242,242 B2* | 1/2016 | Hilgendorff | ............. | B01J 23/63 |
| 9,440,192 B2* | 9/2016 | Hoke | ........................ | F01N 3/10 |
| 9,527,034 B2* | 12/2016 | Bergeal | ................ | B01D 53/945 |
| 9,527,035 B2* | 12/2016 | Bergeal | ................... | B01J 35/04 |
| 9,643,161 B2* | 5/2017 | Chiffey | ................ | B01J 37/0246 |
| 9,987,618 B2* | 6/2018 | Chiffey | ................ | B01J 37/0244 |
| 10,137,414 B2* | 11/2018 | Hoke | .................. | B01D 53/9454 |
| 10,279,314 B2* | 5/2019 | Bergeal | ................. | B01J 35/0006 |
| 10,443,463 B2* | 10/2019 | Hoyer | ................... | F01N 3/0814 |
| 10,493,434 B2* | 12/2019 | Grubert | ................ | B01J 29/7415 |
| 10,569,257 B2* | 2/2020 | Chiffey | .............. | B01D 53/9472 |
| 10,625,208 B2* | 4/2020 | Bergeal | ............... | B01D 53/9468 |
| 10,744,459 B2* | 8/2020 | Hoke | ........................ | B01J 23/63 |
| 2004/0235651 A1 | 11/2004 | Uenishi et al. | | |
| 2008/0038172 A1 | 2/2008 | Chen et al. | | |
| 2009/0257935 A1* | 10/2009 | Southward | ........... | B01J 23/8926 423/213.5 |
| 2010/0183490 A1* | 7/2010 | Hoke | .................. | B01D 53/9477 423/213.5 |
| 2010/0215557 A1 | 8/2010 | Liu et al. | | |
| 2011/0217216 A1 | 9/2011 | Liu et al. | | |
| 2013/0084222 A1 | 4/2013 | Grubert et al. | | |
| 2015/0087497 A1* | 3/2015 | Chiffey | ..................... | F01N 3/10 502/1 |
| 2015/0165422 A1 | 6/2015 | Sung et al. | | |
| 2015/0251169 A1 | 9/2015 | Baba et al. | | |
| 2015/0266014 A1 | 9/2015 | Xue et al. | | |
| 2016/0047286 A1 | 2/2016 | Swallow et al. | | |
| 2016/0074855 A1 | 3/2016 | Qi et al. | | |
| 2016/0136626 A1 | 5/2016 | Phillips et al. | | |
| 2016/0199815 A1 | 7/2016 | Hoshino et al. | | |
| 2020/0206721 A1* | 7/2020 | Chiffey | .............. | B01D 53/9472 |

FOREIGN PATENT DOCUMENTS

| | | |
|---|---|---|
| EP | 2 036 603 | 3/2009 |
| EP | 2 072 121 | 6/2009 |
| EP | 3 476 480 | 5/2019 |
| JP | 2015-516877 | 6/2015 |
| WO | WO 2010/096612 A2 | 8/2010 |
| WO | WO 2011/109676 | 9/2011 |
| WO | WO 2013/042080 A1 | 3/2013 |
| WO | WO 2013/151557 | 10/2013 |
| WO | WO 2015/087871 | 6/2015 |
| WO | WO 2016/024193 A1 | 2/2016 |
| WO | WO 2016/130456 A1 | 8/2016 |
| WO | WO 2017/103855 | 6/2017 |

OTHER PUBLICATIONS

International Search Report for counterpart International Patent Application No. PCT/IB2017/053514, dated Sep. 27, 2017, 2 pages.
Supplemental European Search Report for couinterpart European Application No. 17 812 854, dated Jun. 17, 2020, 6 pages.
Chinese Office Action in counterpart Chinese Patent Application No. 201780050401, dated May 28, 2021 (29 pages) (translation included).
Chinese Search Report in counterpart Chinese Application No. 201780050401, dated May 28, 2021 (3 pages).
Jian Wangping New Automotive Technologies, dated May 31, 2016 (3 pages).

* cited by examiner

PALLADIUM DIESEL OXIDATION CATALYST

CROSS-REFERENCE TO RELATED APPLICATIONS

This application is a national stage filing under 35 U.S.C. 371 of PCT/IB2017/053514, filed Jun. 13, 2017, which claims priority from U.S. Provisional Application No. 62/351,657, filed on Jun. 17, 2016, which applications are hereby incorporated in their entirety by reference in this application.

FIELD OF THE INVENTION

The present invention relates to a diesel oxidation catalyst composition comprising a porous oxygen storage component impregnated with a palladium (Pd) component and at least one second component, methods for the preparation and use of such catalyst compositions, and catalyst articles and systems employing such catalyst compositions.

BACKGROUND OF THE INVENTION

Emissions of diesel engines include particulate matter (PM), nitrogen oxides ($NO_x$), unburned hydrocarbons (HC), and carbon monoxide (CO). $NO_x$ is a term used to describe various chemical species of nitrogen oxides, including nitrogen monoxide (NO) and nitrogen dioxide ($NO_2$), among others. The two major components of exhaust particulate matter are the soluble organic fraction (SOF) and the soot fraction. The SOF condenses on the soot in layers, and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon. The HC content of exhaust can vary depending on engine type and operating parameters, but typically includes a variety of short-chain hydrocarbons such as methane, ethene, ethyne, propene, and the like.

Platinum group metal (PGM) based catalysts are useful in treating the exhaust of diesel engines to convert hydrocarbon and carbon monoxide by catalyzing the oxidation of these pollutants to carbon dioxide and water. In addition, oxidation catalysts that contain platinum promote the oxidation of NO to $NO_2$. For heavy-duty diesel systems, such catalysts are generally contained within regeneration diesel oxidation catalyst (DOC) systems, catalyst soot filter (CSF) systems, or combined DOC-CSF systems. These catalyst systems are placed in the exhaust flow path from diesel power systems to treat the resulting exhaust before it vents to the atmosphere. Typically, diesel oxidation catalysts are deposited on ceramic or metallic substrates. For additional reduction of $NO_x$ species, such systems also typically include at least one Selective Catalytic Reduction (SCR) catalyst downstream from the DOC catalyst. In light and medium-duty applications, the system may contain a lean $NO_x$ trap (LNT) which serves to store and reduce $NO_x$, as well as remove carbon monoxide and unburned hydrocarbons from the exhaust stream.

Catalysts are typically defined by their light-off temperature or the temperature at which 50% conversion is attained, also called $T_{50}$. Catalysts used to treat the exhaust of internal combustion engines are less effective during periods of relatively low temperature operation, such as the initial cold-start period of engine operation, because the engine exhaust is not at a temperature sufficiently high for efficient catalytic conversion to occur. This is particularly true for the downstream catalyst components, such as an SCR catalyst, which can take several minutes to reach a suitable operating temperature.

There is a continuing need in the art to provide catalysts having low light-off temperatures. Such catalysts can sometimes have issues with sulfur poisoning of the PGM within the catalyst. As such, it is desirable to provide catalysts having light-off temperatures that are lower than traditional PGM catalysts, as well as being resistant to sulfur poisoning.

SUMMARY OF THE INVENTION

The invention provides a diesel oxidation catalyst (DOC) composition, the composition comprising at least one platinum group metal (PGM) material combined with a dopant useful in stabilizing the PGM material. In various embodiments, an oxidation catalyst composite for abatement of exhaust gas emissions from a lean burn engine is provided, the catalyst composite comprising a carrier substrate having a length, an inlet end and an outlet end and an oxidation catalyst material coated on the carrier substrate. The oxidation catalyst material can comprise a first layer and a second layer, wherein the first layer comprises a first oxygen storage component impregnated by a palladium (Pd) component and by a second component comprising one or more of magnesium (Mg), rhodium (Rh), and platinum (Pt), and wherein the second layer comprises a refractory metal oxide component impregnated by platinum (Pt), and palladium (Pd), wherein the ratio of Pt to Pd is in the range of about 0:10 to about 10:0 (e.g., 1:1, 2:1, 4:1, 1:2, 1:4, 1:10 etc.). In various embodiments, the carrier substrate can be selected from a flow-through monolith, a wall-flow monolith, a foam, or a mesh.

In various embodiments of the catalyst composite, the first layer can be an under layer coated on the carrier substrate, and the second layer can be an upper layer coated on at least part of the first layer. In some embodiments, the second layer can be an under layer coated on the carrier substrate, and the first layer can be an upper layer coated on at least part of the second layer. The first oxygen storage component and the refractory metal oxide component can be mixed and in the form of a blended layer coated on the carrier substrate, for example. In certain embodiments, the first layer can be an under layer coated on the carrier substrate, and the second layer can be an upper layer coated only on a zone of the first layer. For example, the first layer can be coated on the entire length of the substrate, and the second layer can be only coated on the first layer at the outlet end of the substrate. The first layer can be coated on the entire length of the substrate, and the second layer can be only coated on the first layer at the inlet end of the substrate. In some embodiments, the first layer is an under layer coated on the carrier substrate, and the first layer is coated only on a zone of the carrier substrate.

In various embodiments of the DOC oxidation catalyst composite, the first oxygen storage component comprises ceria in an amount in the range of about 0.1 to about 100 weight percent, based on the total weight of the oxygen storage component before being impregnated. In various embodiments, the palladium component impregnated in the first oxygen storage component can be present in an amount in the range of about 1 g/ft³ to 200 g/ft³.

In certain preferred embodiments, the second component can comprise magnesium (Mg) present in an amount in the range of about 0 to about 5 weight percent, or about 0.1 to about 2 weight percent, or about 0.5 to about 1.0 weight percent, based on the total weight of the impregnated first oxygen storage component. In such embodiments, palladium and magnesium can be impregnated in the first oxygen storage component in a mole ratio of Pd to Mg in a range of about 1:0 to about 1:2. In certain preferred embodiments, the mole ratio of Pd to Mg is about 1:1.

In some embodiments, the second component comprises rhodium present in an amount in the range of about 1 g/ft$^3$ to about 200 g/ft$^3$. In such embodiments, palladium and rhodium can be impregnated in the first oxygen storage component in a mole ratio of Pd to Rh in a range of about 0:10 to about 10:0 (e.g., 1:1, 2:1, 4:1, 1:2, 1:4, 1:10 etc.).

In some embodiments, the second component comprises platinum present in an amount in the range of about 1 g/ft$^3$ to about 200 g/ft$^3$. In such embodiments, palladium and platinum can be impregnated in the first oxygen storage component in a mole ratio of Pd to Pt in a range of about 0:10 to about 10:0 (e.g., 1:1, 2:1, 4:1, 1:2, 1:4, 1:10 etc.).

In certain embodiments, the first oxygen storage component can be further impregnated with a metal dopant selected from the group consisting of praseodymium (Pr), iron (Fe), yttrium (Y), lithium (Li), indium (In), tin (Sn), niobium (Nb), gallium (Ga), zirconium (Zr), iridium (Jr), silver (Ag), neodymium (Nd), tungsten (W), copper (Cu), zinc (Zn), molybdenum (Mo), cobalt (Co), and combinations thereof.

In various embodiments of the DOC oxidation catalyst composite, the refractory metal oxide component is selected from the group consisting of alumina, silica, zirconia, titania, ceria, manganese, and combinations thereof. The refractory metal oxide component can comprise alumina in an amount in the range of about 0.1 to about 100 weight percent, based on the total weight of the refractory metal oxide component before being impregnated, for example. In various embodiments, the refractory metal oxide component can further comprises barium oxide in an amount in the range of about 3 to about 100 g/ft$^3$. In some embodiments, the refractory metal oxide component can comprise a hydrothermally stable zeolite selected from the group consisting of ZSM-5, beta, mordenite, Y-zeolite, a CHA framework type zeolite, ferrierite, and combinations thereof. In various embodiments, the palladium and the platinum impregnated in the refractory metal oxide component are present in an amount in the range of about 1 g/ft$^3$ to 200 g/ft$^3$.

In some embodiments, one or more of the first oxygen storage component and the refractory metal oxide component can be impregnated by manganese in an amount in the range of about 0.1 to 25 wt. %, based on the total weight of the component impregnated by manganese. For example, in some embodiments, the first oxygen storage component can be impregnated by palladium, platinum, and manganese, wherein the manganese is present in an amount in the range of about 0.1 to about 10 weight percent, based on the total weight of the impregnated oxygen storage component.

A catalyst article for abatement of exhaust gas emissions from an engine is also provided herein, comprising a substrate carrier having a plurality of channels adapted for gas flow, wherein a catalyst composition is positioned to contact an exhaust gas passing through each channel, and wherein the catalyst composition comprises a porous oxygen storage component impregnated with a palladium (Pd) component and by a second component comprising at least one of magnesium (Mg), rhodium (Rh), and platinum (Pt). In various embodiments, the oxygen storage component can be a rare earth metal oxide, optionally stabilized with a refractory metal oxide. In certain preferred embodiments, the oxygen storage component comprises ceria. Ceria can be present in an amount in the range of about 0.1 to about 100 weight percent, based on the total weight of the oxygen storage component before being impregnated. The Pd component can be present in amount of about 1-10% by weight, based on the total weight of impregnated oxygen storage component.

In various embodiments of the catalyst article, the second component comprises a Mg component, and the Pd and the Mg are present in molar ratio of about 1:0 to about 1:2. In some embodiments, the Mg component is present in amount of no more than about 0.5% by weight, based on the total weight of the impregnated oxygen storage component. For example, the Mg component can be present in amount of about 0.1 to about 0.5% by weight, based on the total weight of impregnated oxygen storage component.

In various embodiments of the catalyst article, the oxygen storage component is further impregnated with a rhodium (Rh) component. In some embodiments, the catalyst article can further include a second porous oxygen storage component impregnated by a rhodium (Rh) component. For example, the catalyst article can comprise a first layer and a second layer, wherein the first layer comprises the porous oxygen storage component impregnated with the palladium (Pd) component and the second component, wherein the second component comprises a magnesium (Mg) component, and wherein the second layer comprises a second porous oxygen storage component impregnated with a rhodium (Rh) component. In some embodiments, the catalyst article can further comprise a metal dopant impregnated within the oxygen storage component, the metal selected from the group consisting of praseodymium (Pr), iron (Fe), yttrium (Y), lithium (Li), indium (In), tin (Sn), niobium (Nb), gallium (Ga), zirconium (Zr), iridium (Ir), silver (Ag), neodymium (Nd), tungsten (W), copper (Cu), zinc (Zn), molybdenum (Mo), cobalt (Co), and combinations thereof.

An emission treatment system for treatment of an exhaust gas stream is also provided herein, the emission treatment system comprising a diesel engine producing an exhaust gas stream, and an oxidation catalyst composite or catalyst article as described herein which is positioned in fluid communication with the exhaust gas stream and adapted for oxidation of carbon monoxide and hydrocarbon gases within the exhaust stream to form a treated exhaust gas stream. In some embodiments, the system can further include a catalyzed soot filter and an SCR catalyst situated downstream from the catalyst composite. The SCR catalyst can be present as a washcoat on the catalyzed soot filter. In some embodiments, the SCR catalyst is a flow through monolith situated downstream from the catalyst composite, and the catalyzed soot filter is situated downstream from the SCR catalyst. In certain embodiments, the SCR catalyst comprises a molecular sieve having a double six ring (d6r) unit. The SCR catalyst can be selected from a CHA, AEI, or AFX framework type zeolite, for example. In some embodiments, the SCR catalyst can be promoted with a metal selected from Cu, Fe, Co, Ni, La, Ce, Mn, V, Ag, or combinations thereof.

A method of treating an exhaust stream from a diesel engine is also provided herein, the method comprising passing the exhaust stream through the oxidation catalyst composite or catalyst article described herein such that NO is oxidized within the catalyst. The method can further include passing the exhaust stream through an SCR catalyst situated downstream from the oxidation catalyst composite of claim 1. In some embodiments, the SCR catalyst can be disposed on a wall flow filter monolith.

The invention includes, without limitation, the following embodiments.

EMBODIMENT 1

An oxidation catalyst composite for abatement of exhaust gas emissions from a lean burn engine, the catalyst composite comprising: a carrier substrate having a length, an inlet end and an outlet end; and an oxidation catalyst material coated on the carrier substrate; wherein the oxidation catalyst material comprises a first layer and a second layer; wherein the first layer comprises a first oxygen storage component impregnated by a palladium (Pd) component and by a second component comprising one or more of magnesium (Mg), rhodium (Rh), and platinum (Pt); and wherein the second layer comprises a refractory metal oxide component impregnated by platinum (Pt), and palladium (Pd), wherein the ratio of Pt to Pd is in the range of about 0:10 to about 10:0.

EMBODIMENT 2

An oxidation catalyst composite of any preceding or subsequent embodiment, wherein the first layer is an under layer coated on the carrier substrate, and the second layer is an upper layer coated on at least part of the first layer.

EMBODIMENT 3

An oxidation catalyst composite of any preceding or subsequent embodiment, wherein the second layer is an under layer coated on the carrier substrate, and the first layer is an upper layer coated on at least part of the second layer.

EMBODIMENT 4

An oxidation catalyst composite of any preceding or subsequent embodiment, wherein the first oxygen storage component and the refractory metal oxide component are mixed and in the form of a blended layer coated on the carrier substrate.

EMBODIMENT 5

An oxidation catalyst composite of any preceding or subsequent embodiment, wherein the first layer is an under layer coated on the carrier substrate, and the second layer is an upper layer coated only on a zone of the first layer.

EMBODIMENT 6

An oxidation catalyst composite of any preceding or subsequent embodiment, wherein the first layer is coated on the entire length of the substrate, and wherein the second layer is only coated on the first layer at the outlet end of the substrate.

EMBODIMENT 7

An oxidation catalyst composite of any preceding or subsequent embodiment, wherein the first layer is coated on the entire length of the substrate, and wherein the second layer is only coated on the first layer at the inlet end of the substrate.

EMBODIMENT 8

An oxidation catalyst composite of any preceding or subsequent embodiment, wherein the first layer is an under layer coated on the carrier substrate, and the first layer is coated only on a zone of the carrier substrate.

EMBODIMENT 9

An oxidation catalyst composite of any preceding or subsequent embodiment, wherein the first oxygen storage component comprises ceria in an amount in the range of about 0.1 to about 100 weight percent, based on the total weight of the oxygen storage component before being impregnated.

EMBODIMENT 10

An oxidation catalyst composite of any preceding or subsequent embodiment, wherein the refractory metal oxide component is selected from the group consisting of alumina, silica, zirconia, titania, ceria, manganese, and combinations thereof.

EMBODIMENT 11

An oxidation catalyst composite of any preceding or subsequent embodiment, wherein the refractory metal oxide component comprises alumina.

EMBODIMENT 12

An oxidation catalyst composite of any preceding or subsequent embodiment, wherein the palladium component impregnated in the first oxygen storage component is present in an amount in the range of about 1 $g/ft^3$ to 200 $g/ft^3$.

EMBODIMENT 13

An oxidation catalyst composite of any preceding or subsequent embodiment, wherein one or more of the first oxygen storage component and the refractory metal oxide component is impregnated by manganese in an amount in the range of about 0.1 to 25 wt. %, based on the total weight of the component impregnated by manganese.

EMBODIMENT 14

An oxidation catalyst composite of any preceding or subsequent embodiment, wherein the second component comprises magnesium (Mg), and wherein magnesium is present in an amount in the range of about 0.1 to about 5 weight percent, based on the total weight of the impregnated first oxygen storage component.

EMBODIMENT 15

An oxidation catalyst composite of any preceding or subsequent embodiment, wherein palladium and magnesium are impregnated in the first oxygen storage component in a mole ratio of Pd to Mg in a range of about 1:0 to about 1:2.

EMBODIMENT 16

An oxidation catalyst composite of any preceding or subsequent embodiment, wherein the second component comprises rhodium, and wherein the rhodium is present in an amount in the range of about 1 $g/ft^3$ to about 200 $g/ft^3$.

EMBODIMENT 17

An oxidation catalyst composite of any preceding or subsequent embodiment, wherein palladium and rhodium are impregnated in the first oxygen storage component in a mole ratio of Pd to Rh in a range of about 0:10 to about 10:0.

EMBODIMENT 18

An oxidation catalyst composite of any preceding or subsequent embodiment, wherein the second component comprises platinum, and wherein the platinum is present in an amount in the range of about 1 g/ft$^3$ to about 200 g/ft$^3$.

EMBODIMENT 19

An oxidation catalyst composite of any preceding or subsequent embodiment, wherein palladium and platinum are impregnated in the first oxygen storage component in a mole ratio of Pd to Pt in a range of about 0:10 to about 10:0.

EMBODIMENT 20

An oxidation catalyst composite of any preceding or subsequent embodiment, wherein the first oxygen storage component is further impregnated with a metal selected from the group consisting of praseodymium (Pr), iron (Fe), yttrium (Y), lithium (Li), indium (In), tin (Sn), niobium (Nb), gallium (Ga), zirconium (Zr), iridium (Jr), silver (Ag), neodymium (Nd), tungsten (W), copper (Cu), zinc (Zn), molybdenum (Mo), cobalt (Co), and combinations thereof.

EMBODIMENT 21

An oxidation catalyst composite of any preceding or subsequent embodiment, wherein the second component comprises platinum, and where the first oxygen storage component is further impregnated with a manganese component in the amount of about 0.1 to about 10 weight percent, based on the total weight of the impregnated first oxygen storage component.

EMBODIMENT 22

An oxidation catalyst composite of any preceding or subsequent embodiment, wherein the refractory metal oxide component further comprises barium oxide in an amount in the range of about 3 to about 100 g/ft$^3$.

EMBODIMENT 23

An oxidation catalyst composite of any preceding or subsequent embodiment, wherein the refractory metal oxide component comprises a hydrothermally stable zeolite selected from the group consisting of ZSM-5, beta, mordenite, Y-zeolite, a CHA framework type zeolite, ferrierite, and combinations thereof.

EMBODIMENT 24

An oxidation catalyst composite of any preceding or subsequent embodiment, wherein the palladium and the platinum impregnated in the refractory metal oxide component are present in an amount in the range of about 1 g/ft$^3$ to 200 g/ft$^3$.

EMBODIMENT 25

An oxidation catalyst composite of any preceding or subsequent embodiment, wherein the carrier substrate is selected from a flow-through monolith, a wall-flow monolith, a foam, or a mesh.

EMBODIMENT 26

A catalyst article for abatement of exhaust gas emissions from an engine, comprising: a substrate carrier having a plurality of channels adapted for gas flow, wherein a catalyst composition is positioned to contact an exhaust gas passing through each channel, wherein the catalyst composition comprises a porous oxygen storage component impregnated with a palladium (Pd) component and by a second component comprising at least one of magnesium (Mg), rhodium (Rh), and platinum (Pt).

EMBODIMENT 27

A catalyst article of any preceding or subsequent embodiment, wherein the oxygen storage component is a rare earth metal oxide, optionally stabilized with a refractory metal oxide.

EMBODIMENT 28

A catalyst article of any preceding or subsequent embodiment, wherein the oxygen storage component comprises ceria.

EMBODIMENT 29

A catalyst article of any preceding or subsequent embodiment, wherein ceria is present in an amount in the range of about 0.1 to about 100 weight percent, based on the total weight of the oxygen storage component before being impregnated.

EMBODIMENT 30

A catalyst article of any preceding or subsequent embodiment, wherein the second component comprises a Mg component, and wherein the Pd and the Mg are present in molar ratio of about 1:0 to about 1:2.

EMBODIMENT 31

A catalyst article of any preceding or subsequent embodiment, wherein the Mg component is present in amount of no more than about 0.5% by weight, based on the total weight of the impregnated oxygen storage component.

EMBODIMENT 32

A catalyst article of any preceding or subsequent embodiment, wherein the Mg component is present in amount of about 0.1 to about 0.5% by weight, based on the total weight of impregnated oxygen storage component.

EMBODIMENT 33

A catalyst article of any preceding or subsequent embodiment, wherein the oxygen storage component is further impregnated with a rhodium (Rh) component.

EMBODIMENT 34

A catalyst article of any preceding or subsequent embodiment, further comprising a second porous oxygen storage component impregnated with a rhodium (Rh) component.

EMBODIMENT 35

A catalyst article of any preceding or subsequent embodiment, wherein the catalyst composition comprises a first layer and a second layer, wherein the first layer comprises the porous oxygen storage component impregnated with the palladium (Pd) component and the second component, wherein the second component comprises a magnesium (Mg) component, and wherein the second layer comprises a second porous oxygen storage component impregnated with a rhodium (Rh) component.

EMBODIMENT 36

A catalyst article of any preceding or subsequent embodiment, wherein Pd component is present in amount of about 1-10% by weight, based on the total weight of impregnated oxygen storage component.

EMBODIMENT 37

A catalyst article of any preceding or subsequent embodiment, further comprising a metal impregnated within the oxygen storage component, the metal selected from the group consisting of praseodymium (Pr), iron (Fe), yttrium (Y), lithium (Li), indium (In), tin (Sn), niobium (Nb), gallium (Ga), zirconium (Zr), iridium (Ir), silver (Ag), neodymium (Nd), tungsten (W), copper (Cu), zinc (Zn), molybdenum (Mo), cobalt (Co), and combinations thereof.

EMBODIMENT 38

An emission treatment system for treatment of an exhaust gas stream, the emission treatment system comprising: a diesel engine producing an exhaust gas stream; and an oxidation catalyst composite of any preceding or subsequent embodiment positioned in fluid communication with the exhaust gas stream and adapted for oxidation of carbon monoxide and hydrocarbon gases within the exhaust stream to form a treated exhaust gas stream.

EMBODIMENT 39

An emission treatment system of any preceding or subsequent embodiment, further comprising a catalyzed soot filter and an SCR catalyst situated downstream from the catalyst composite.

EMBODIMENT 40

An emission treatment system of any preceding or subsequent embodiment, wherein the SCR catalyst is present as a washcoat on the catalyzed soot filter.

EMBODIMENT 41

An emission treatment system of any preceding or subsequent embodiment, wherein the SCR catalyst is a flow through monolith situated downstream from the catalyst composite, and wherein the catalyzed soot filter is situated downstream from the SCR catalyst.

EMBODIMENT 42

An emission treatment system of any preceding or subsequent embodiment, wherein the SCR catalyst comprises a molecular sieve having a double six ring (d6r) unit.

EMBODIMENT 43

An emission treatment system of any preceding or subsequent embodiment, wherein the SCR catalyst is selected from a CHA, AEI, or AFX framework type zeolite.

EMBODIMENT 44

An emission treatment system of any preceding or subsequent embodiment, wherein the SCR catalyst is promoted with a metal selected from Cu, Fe, Co, Ni, La, Ce, Mn, V, Ag, or combinations thereof.

EMBODIMENT 45

A method of treating an exhaust stream from a diesel engine, comprising passing the exhaust stream through an oxidation catalyst composite of any preceding or subsequent embodiment such that NO is oxidized within the catalyst.

EMBODIMENT 46

The method of any preceding or subsequent embodiment, further comprising passing the exhaust stream through an SCR catalyst situated downstream from the oxidation catalyst composite of claim 1.

EMBODIMENT 47

The method of any preceding or subsequent embodiment, wherein the SCR catalyst is disposed on a wall flow filter monolith.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1B:
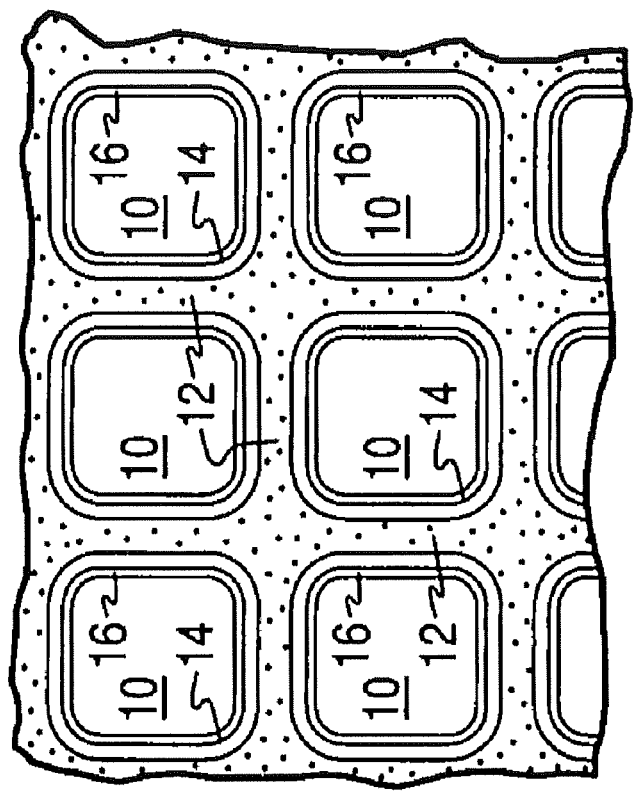
FIG. 1B is a partial cross-sectional view enlarged relative to FIG. 1A and taken along a plane parallel to the end faces of the carrier of FIG. 1A, which shows an enlarged view of a plurality of the gas flow passages shown in FIG. 1A.

The present invention now will be described more fully hereinafter. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents. It is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The articles "a" and "an" are used herein to refer to one or to more than one (i.e., to at least one) of the grammatical object of the article. By way of example, "a reducing agent" means one reducing agent or more than one reducing agent. Any ranges cited herein are inclusive. The term "about" used throughout this specification are used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0. The term "substantially" similarly is used to describe and account for small fluctuations. Accordingly, where a composition is referred to as "substantially free" of a given component, unless otherwise specified, this can mean, e.g., that the composition comprises less than about 5%, such as less than about 2%, less than about 1%, less than about 0.5%, less than about 0.1%, or less than about 0.05% of that component by weight of the composition. All measurements herein are performed at ambient conditions, 25° C. and 1 atm of pressure, unless otherwise indicated.

Where ranges in the claims of this application do not find explicit support in the specification, it is intended that such claims provide their own disclosure as support for claims or teachings in a later amendment of this application. Numerical ranges of ingredients that are bounded by zero on the lower end (for example, 0-5 weight % Mg component) are intended to provide support for the concept "up to [the upper limit]," for example "up to 0.5 weight percent % Mg component," vice versa, as well as a positive recitation that the ingredient in question is present in an amount that does not exceed the upper limit. An example of the latter is "comprises Mg, provided the amount does not exceed 0.5 weight percent %." A recitation such as "8-25 weight percent % (PGM+second component+optional metal component)" means that any or all of PGM, second component, and/or optional metal component may be present in an amount of 8-25 weight percent % of the composition.

The present invention generally provides a diesel oxidation catalyst (DOC) composition suitable for at least partial oxidation of NO to $NO_2$, which may optionally further comprise a CSF component to treat the soluble organic fraction of particulate matter present in diesel exhaust. The DOC compositions disclosed herein comprise a porous refractory oxide support impregnated by a PGM component as well as a second component comprising one or more of magnesium (Mg), rhodium (Rh), and platinum (Pt), wherein such compositions provide enhanced NO oxidation as compared with comparable compositions comprising PGM complexes impregnated on a porous refractory oxide support. As used herein, "impregnated" or "impregnation" refers to permeation of catalytic material into the porous structure of the support material or attached to a surface of the support material. The DOC compositions can be prepared and coated onto a catalyst substrate using a washcoat technique as set forth more fully below.

Catalyst Composition

The DOC composition can include an oxygen storage component (OSC) impregnated with at least one platinum group metal (PGM) material combined with a dopant or a second PGM material useful in stabilizing the first PGM material. As used herein, "platinum group metal" or "PGM" refers to platinum group metals or oxides thereof, including platinum (Pt), palladium (Pd), ruthenium (Ru), rhodium (Rh), osmium (Os), iridium (Jr), and mixtures thereof. In certain embodiments, the platinum group metal comprises palladium. The concentrations of PGM component (e.g., Pd) can vary, but will typically be from about 0.1 wt. % to about 10 wt. % relative to the weight of the impregnated porous oxygen storage component (e.g., about 1 wt. % to about 6 wt. % relative to the OSC) in a given composition. In some embodiments, the concentration of the PGM component can be about 2 wt. % to about 4 wt. %, based on the total weight of the impregnated oxygen storage component.

In various embodiments, the oxygen storage component is a rare earth oxide, optionally stabilized with a refractory metal oxide. "Refractory metal oxides" or "porous refractory oxides" refers to porous metal-containing oxide materials exhibiting chemical and physical stability at high temperatures, such as the temperatures associated with diesel engine exhaust. Exemplary refractory oxides include alumina, silica, zirconia, titania, ceria, and physical mixtures or chemical combinations thereof, including atomically-doped combinations and including high surface area or activated compounds such as activated alumina. Exemplary combinations of metal oxides include alumina-zirconia, alumina-ceria-zirconia, lanthana-alumina, lanthana-zirconia-alumina, baria-alumina, baria lanthana-alumina, baria lanthana-neodymia alumina, and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina, and low bulk density large pore boehmite and gamma-alumina, available from BASF Catalysts LLC (Port Allen, La., USA).

High surface area refractory oxide supports, such as alumina support materials, also referred to as "gamma alumina" or "activated alumina," typically exhibit a BET surface area in excess of 60 $m^2/g$, often up to about 200 $m^2/g$ or higher. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of 60 to 350 $m^2/g$, and typically 90 to 250 $m^2/g$.

In certain preferred embodiments, the oxygen storage component comprises ceria. The ceria can be present in an amount of about 0.1 to about 100 weight percent, or about 70 to about 100 weight percent, based on the total weight of the oxygen storage component before it is impregnated. The ceria support can have a BET surface area of about 140 to 160 $M^2/g$ and a pore volume between 0.3 to 0.5 cc/g, for example.

In various embodiments, the DOC catalyst composition can comprise a dopant useful in lowering the light-off temperature of the catalyst composition and/or stabilizing the PGM component. It was surprisingly discovered that certain metals can be useful in lowering the CO and HC light-off temperatures of a catalyst composition, as compared to catalyst compositions that do not include the metal dopant component. For example, the dopant can be a metal selected from the group consisting of magnesium (Mg), praseodymium (Pr), iron (Fe), yttrium (Y), lithium (Li), indium (In), tin (Sn), niobium (Nb), gallium (Ga), zirconium (Zr), iridium (Ir), silver (Ag), neodymium (Nd), tungsten (W), copper (Cu), zinc (Zn), rhodium (Rh), molybdenum (Mo), cobalt (Co), and combinations thereof. The metal component can be present in amount of about 0.1 to about 10% by weight, or about 0.1 to about 5% by weight, or about 0.1 to about 0.5% by weight, based on the total weight of the impregnated oxygen storage component. In certain embodiments, the metal dopant component can be present in an amount of no more than about 0.5% by weight, based on the total weight of the impregnated oxygen storage component.

In some embodiments, the catalyst composition comprises a porous oxygen storage component comprising ceria impregnated with a palladium (Pd) component and a magnesium (Mg) component. The Mg component can allow the Pd catalyst composition to achieve lower light-off temperatures for fresh, aged, and regenerated catalytic articles. The Pd component and the Mg component can be present in a molar ratio of about 1:0 to about 1:2. In certain embodiments, the Pd component and the Mg component can be present in a molar ratio of about 1:1. The Pd component can be present in an amount of about 1-10% by weight, based on the total weight of impregnated oxygen storage component. For example, the Pd component can be present in an amount of about 2-4% by weight, based on the total weight of impregnated oxygen storage component. The Mg component can be present in an amount of about 0.1 to about 5% by weight, based on the total weight of impregnated oxygen storage component. In certain embodiments, the Mg component can be present in an amount of no more than about 0.5% by weight, based on the total weight of the impregnated oxygen storage component.

In certain preferred embodiments, the DOC catalyst composition comprises a porous oxygen storage component comprising ceria impregnated with a palladium (Pd) component and a second component comprising at least one of platinum (Pt), magnesium (Mg), rhodium (Rh), and combinations thereof. Without being limited by theory, the Mg, Pt, and/or Rh component can allow the Pd catalyst composition to be more resistant to sulfur poisoning and to achieve lower light-off temperatures for fresh, aged, and regenerated catalytic articles. The Pd component and the second component (i.e., the Pt, Mg, and/or Rh component) can be present in a molar ratio in the range of about 1:0 to about 1:2, or about 0:10 to about 10:0. In certain embodiments, the Pd component and the second component can be present in a molar ratio of about 1:1. The Pd component can be present in an amount of about 1-10% by weight, based on the total weight of impregnated oxygen storage component. For example, the Pd component can be present in an amount of about 2-4% by weight, based on the total weight of impregnated oxygen storage component. The second component can be present in an amount of about 0.1 to about 5% by weight, based on the total weight of impregnated oxygen storage component. In certain embodiments, the second component can be present in an amount of no more than about 0.5% by weight, based on the total weight of the impregnated oxygen storage component.

In various embodiments of the DOC catalyst compositions described herein, the oxygen storage component can be impregnated with a Pd component and an Mg and/or Pt component, and the catalyst composition can further comprise a Rh component. In such embodiments, the Rh can be impregnated in the same oxygen storage component as the Mg and/or Pt, or the catalyst composition can further include a second porous oxygen storage component impregnated with a rhodium (Rh) component. For example, the catalyst composition can include a first layer and a second layer, wherein the first layer comprises the porous oxygen storage component impregnated with a palladium (Pd) component and a magnesium (Mg) component, and wherein the second layer comprises a second porous oxygen storage component impregnated with the rhodium (Rh) component.

In various embodiments of the present invention, the catalyst composition can further comprise an additional refractory metal oxide and a molecular sieve, wherein the refractory metal oxide component is impregnated with a platinum (Pt) component and a palladium (Pd) component, and wherein the Pt and the Pd components are present in a molar ratio in the range of about 1:10 to about 10:1. In various embodiments, the refractory metal oxide can comprise alumina. In certain embodiments, the molecular sieve can comprise a zeolite.

As used herein, the term "molecular sieves" refers to zeolites and other zeolitic framework materials (e.g. isomorphously substituted materials), which may, in particulate form, support catalytic metals. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, further including silicon and aluminum atoms. According to one or more embodiments, it will be appreciated that by defining the molecular sieves by their structure type, it is intended to include the structure type and any and all isotypic framework materials such as silico-alumino-phosphate (SAPO), alumino-phosphate (ALPO) and metal-alumino-phosphate (MeAPO) materials having the same structure type, as well as borosilicates, gallosilicates, mesoporous silica materials such as SBA-15 or MCM-41, and the like.

In certain embodiments, the molecular sieve may comprise a zeolite or zeotype selected from the group consisting of a chabazite, ferrierite, clinoptilolite, silico-alumino-phosphate (SAPO), beta-zeolite, Y-zeolite, mordenite, faujasite, ZSM-5, mesoporous materials, and combinations thereof. The zeolite may be ion-exchanged with a metal, such as a metal selected from the group consisting of La, Ba, Sr, Mg, Pt, Pd, Ag, Cu, V, Ni, Co, Fe, Zn, Mn, Ce, and combinations thereof.

In various embodiments of the present invention, the catalyst composition can further comprise a manganese component impregnated on the oxygen storage component comprising ceria and/or on the additional refractory metal oxide component. The manganese component can be present in an amount of about 0.1 to about 25 weight percent, or about 1 to about 10 weight percent, based on the total weight of the catalyst composition or based on the total weight of the component impregnated by manganese for multi-layer catalyst compositions. For example, in some embodiments, the first oxygen storage component can be impregnated by palladium, platinum, and manganese, wherein the manganese is present in an amount in the range of about 0.1 to about 10 weight percent, based on the total weight of the impregnated oxygen storage component. Without being limited by theory, manganese can be useful in improving light-off performance by lowering the light-off temperature of the catalyst, as well as enhancing the catalyst resistance to sulfur poisoning.

Method of Making Catalyst Composition

Preparation of a porous support with a PGM component, a second component, or dopant typically comprises impregnating the porous support (e.g., a refractory oxide support material in particulate form such as particulate ceria) with a PGM or metal dopant solution. Multiple metal components (e.g., platinum and palladium) can be impregnated at the same time or separately, and can be impregnated on the same support particles or separate support particles using an incipient wetness technique. The support particles are typically dry enough to absorb substantially all of the solution to form a moist solid. Aqueous solutions of water soluble compounds or complexes of the metal component are typically utilized, such as palladium or platinum nitrate, tetraammine palladium or platinum nitrate, tetraammine palladium or platinum acetate, copper (II) nitrate, manganese (II) nitrate, and ceric ammonium nitrate. Following treatment of the support particles with the metal solutions, the particles are dried, such as by heat treating the particles at elevated temperature (e.g., 100-150° C.) for a period of time (e.g., 1-3 hours), and then calcining to convert the metal components to a more catalytically active form. An exemplary calcination process involves heat treatment in air at a temperature of about 400-550° C. for 1-3 hours. The above process can be repeated as needed to reach the desired level of impregnation. The resulting material can be stored as a dry powder or in slurry form.

Catalyst Composite

As noted above, a catalyst article comprising the DOC composition of the invention exhibits enhanced NO conversion activity. Accordingly, one or more embodiments of the invention provide a catalyst article comprising a calcined DOC composition as disclosed herein (where the refractory metal oxide, the PGM component, the second component, and any optional metal components are mixed or are layered), characterized by higher sulfur resistance and/or lower CO and HC light-off temperatures for fresh, aged, and/or regenerated catalyst compositions than exhibited by a comparable catalyst article that does not include the second component or the optional metal components.

In certain preferred embodiments, an oxidation catalyst composite for abatement of exhaust gas emissions from a lean burn engine is provided, the catalyst composite comprising a carrier substrate having a length, an inlet end and an outlet end, and a washcoat of an oxidation catalyst material on the carrier. The carrier substrate can be selected from a flow-through monolith, a wall-flow monolith, a foam, or a mesh, for example. The oxidation catalyst material can comprise a first layer and a second layer.

In various embodiments, the first layer of the oxidation catalyst material can comprise a porous oxygen storage component comprising ceria impregnated with a palladium (Pd) component and a second component comprising a material selected from the group consisting of a platinum (Pt), magnesium (Mg), rhodium (Rh), and combinations thereof. The porous oxygen storage component can comprise ceria in an amount in the range of about 0.1 to about 100 weight percent, based on the total weight of the oxygen storage component before it is impregnated with additional components. Without being limited by theory, the Mg, Pt, and/or Rh component can allow the Pd catalyst composition to be more resistant to sulfur poisoning and/or to achieve lower light-off temperatures for fresh, aged, and regenerated catalytic articles. The Pd component and the second component can be present in a molar ratio in the range of about 1:0 to about 1:2, or about 0:10 to about 10:0 (e.g., 1:1, 2:1, 4:1, 1:2, 1:4, 1:10 etc.). In certain embodiments, the Pd component and the second component can be present in a molar ratio of about 1:1. The Pd component can be present in an amount of about 1-10% by weight, based on the total weight of impregnated oxygen storage component. For example, the Pd component can be present in an amount of about 1-4% by weight, based on the total weight of impregnated oxygen storage component.

In various embodiments, the second component can comprise magnesium. The second component comprising magnesium can be present in an amount of about 0.1 to about 5% by weight, based on the total weight of impregnated oxygen storage component. In certain embodiments, the second component comprising magnesium can be present in an amount of no more than about 0.5% by weight, or no more than about 1% by weight, based on the total weight of the impregnated oxygen storage component. The molar ratio of the palladium to the magnesium can be in the range of about 1:0 to about 1:2. In certain embodiments, the molar ratio of the palladium to the magnesium can be about 1:1.

In some embodiments, the second component can comprise platinum. The platinum can be present in an amount in the range of about 1 $g/ft^3$ to 200 g/ft'. The weight ratio of palladium to platinum can be in the range of about 0:10 to about 10:0 (e.g., 1:1, 2:1, 4:1, 1:2, 1:4, 1:10 etc.), based on the total weight of the impregnated oxygen storage component.

In some embodiments, the second component can comprise rhodium. The rhodium can be present in an amount in the range of about 1 $g/ft^3$ to 200 g/ft'. The weight ratio of palladium to rhodium can be in the range of about 0:10 to about 10:0 (e.g., 1:1, 2:1, 4:1, 1:2, 1:4, 1:10 etc.), based on the total weight of the impregnated oxygen storage component.

In various embodiments, the first layer can further comprise an additional metal dopant impregnated in the porous oxygen storage component. The metal can be selected from the group consisting of praseodymium (Pr), iron (Fe), yttrium (Y), lithium (Li), indium (In), tin (Sn), niobium (Nb), gallium (Ga), zirconium (Zr), iridium (Ir), silver (Ag), neodymium (Nd), tungsten (W), copper (Cu), zinc (Zn), molybdenum (Mo), cobalt (Co), and combinations thereof. In some embodiments, the porous oxygen storage component can be further impregnated with barium oxide in an amount in the range of about 3 to 100 $g/ft^3$.

In various embodiments of the present invention, the catalyst composition can comprise a second layer comprising a refractory metal oxide component and a molecular sieve, wherein the refractory metal oxide component is impregnated by platinum (Pt) and palladium (Pd), and wherein the Pt and the Pd are present in a molar ratio in the range of about 0:10 to about 10:0 (e.g., 1:1, 2:1, 4:1, 1:2, 1:4, 1:10 etc.). In various embodiments, the Pt and the Pd can each be present in an amount in the range of about 1 $g/ft^3$ to 200 $g/ft^3$. In some embodiments, the refractory metal oxide support can comprise one or more of alumina, silica, zirconia, titania, ceria, or manganese. In various preferred embodiments, the refractory metal oxide can comprise alumina. In certain embodiments, the molecular sieve can comprise a zeolite. In some embodiments, the refractory metal oxide component comprises a hydrothermally stable zeolite selected from ZSM-5, beta, mordenite, Y-zeolite, a CHA framework type zeolite, ferrierite, and combinations thereof.

In certain embodiments of the present invention, the catalyst composition can further comprise a manganese component. The manganese component can be impregnated in the porous oxygen storage component comprising ceria and/or in the refractory metal oxide component. The manganese component can thereby be present in the first layer of the catalyst material and/or in the second layer of the catalyst material. The manganese component can present in an amount in the range of about 0.1 to about 25 weight percent, or about 1 to about 10 weight percent, based on the total weight of the impregnated component(s).

In various embodiments of the present invention, the first layer can be an under layer situated on the carrier substrate and the second layer can be a top layer situated on the first layer. In some embodiments, the second layer can be an under layer situated on the carrier substrate and the first layer can be a top layer situated on the second layer.

In certain embodiments, the porous oxygen storage component comprising ceria and the second oxygen storage component can be mixed to form a blended layer which can then be coated on the substrate.

In some embodiments, the first layer can be an under layer situated on the carrier substrate and the second layer can be a zoned upper layer situated on at least a portion of the under layer. For example, the second layer can be situated on the outlet end of the carrier substrate and over the first layer which covers the entire carrier substrate as an under layer. As such, only the first layer would be present at the inlet end of the carrier substrate. In some embodiments, the second layer can be situated on the inlet end of the carrier substrate and over the first layer which covers the entire carrier substrate as an under layer. As such, only the first layer would be present at the outlet end of the carrier substrate. The first and second layer can be oriented in any zone configuration as desired for the catalyst composite.

Substrate

According to one or more embodiments, the substrate for the DOC composition may be constructed of any material typically used for preparing automotive catalysts and will typically comprise a metal or ceramic honeycomb structure. The substrate typically provides a plurality of wall surfaces upon which the DOC washcoat composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst composition associated therewith (e.g., a DOC composition) can permeate into the pore structure of the porous walls (i.e., partially or fully occluding the pore openings) in addition to being disposed on the surface of the walls.

Figure 1A:
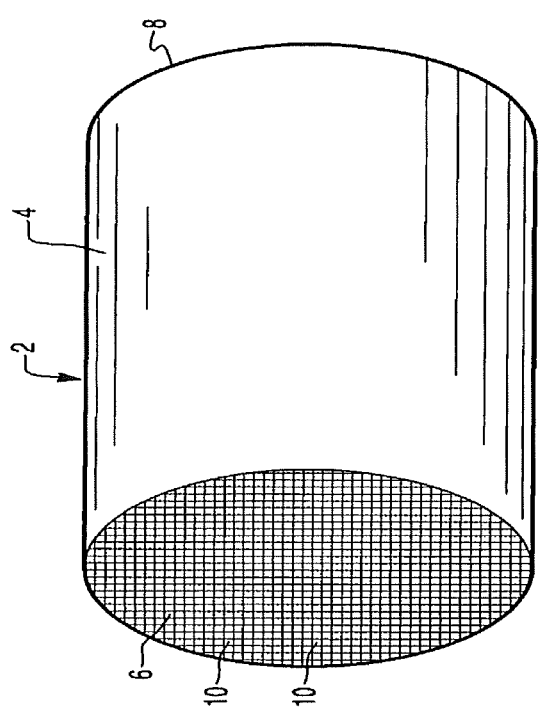
FIG. 1A is a perspective view of a honeycomb-type substrate which may comprise a diesel oxidation catalyst (DOC) washcoat composition in accordance with the present invention.

FIGS. 1A and 1B illustrate an exemplary substrate 2 in the form of a flow-through substrate coated with a washcoat composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. In one particular embodiment, a first layer (e.g., layer 14) comprises an oxygen storage component impregnated by a Pd component and a second component, and a second layer (e.g., layer 16) comprises a molecular sieve and a refractory metal oxide component impregnated by Pd and Pt. The present invention can be practiced with one or more (e.g., 2, 3, or 4) washcoat layers and is not limited to the two-layer embodiment illustrated in FIG. 1B.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. Other units of weight per volume such as g/L are also sometimes used. The total loading of the DOC composition on the catalyst substrate, such as a monolithic flow-through substrate, is typically from about 0.5 to about 6 g/in$^3$, and more typically from about 1 to about 5 g/in$^3$. Total loading of the PGM component without support material (e.g., the Pd) is typically in the range of about 5 to about 200 g/ft$^3$ (e.g., about 5 to about 50 g/ft$^3$ and, in certain embodiments, about 10 to about 50 g/ft$^3$ or about 10 to about 100 g/ft$^3$). It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Substrate Coating Process

The catalyst composition can be used in the form of a packed bed of powder, beads, or extruded granules. However, in certain advantageous embodiments, the catalyst composition is coated on a substrate. The catalyst composition can be mixed with water (if in dried form) to form a slurry for purposes of coating a catalyst substrate. In addition to the catalyst particles, the slurry may optionally contain alumina as a binder, associative thickeners, and/or surfactants (including anionic, cationic, non-ionic or amphoteric surfactants). In some embodiments, the pH of the slurry can be adjusted, e.g., to an acidic pH of about 3 to about 5.

When present, an alumina binder is typically used in an amount of about 0.02 g/in$^3$ to about 0.5 g/in$^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a D90 particle size of about 10 to about 50 microns (e.g., about 10 to about 20 microns). The D90 is defined as the particle size at which about 90% of the particles have a finer particle size.

The slurry is then coated on the catalyst substrate using a washcoat technique known in the art. As used herein, the term "washcoat" has its usual meaning in the art of a thin, adherent coating of a material applied to a substrate, such as a honeycomb flow-through monolith substrate or a filter substrate which is sufficiently porous to permit the passage therethrough of the gas stream being treated. As used herein and as described in Heck, Ronald and Robert Farrauto, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can have unique chemical catalytic functions.

In one embodiment, the substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

The catalyst composition can be applied as a single layer or in multiple layers. A catalyst layer resulting from repeated washcoating of the same catalyst material to build up the loading level is typically viewed as a single layer of catalyst. In another embodiment, the catalyst composition is applied in multiple layers with each layer having a different composition. Additionally, the catalyst composition can be zone-coated, meaning a single substrate can be coated with different catalyst compositions in different areas along the gas effluent flow path.

In other embodiments, the components of the DOC composition are separately coated on a substrate (and, in such embodiments, the "DOC composition" thus is not prepared until the substrate is coated with all necessary components, e.g., the PGM component, the second component, and the oxygen storage component). For example, in some embodiments, a post-dip method is employed, wherein a substrate is first coated with an oxygen storage material by adding water to the oxygen storage material in particulate form and applying the resulting slurry to the substrate as a washcoat. The discussion above with regard to DOC composition slurries is relevant in the context of the oxygen storage material slurry in this embodiment. Accordingly, the types of additional components, the milling and the methods of applying the oxygen storage material slurry are the same as referenced above with regard to the DOC composition slurry. For example, after coating the oxygen storage material slurry onto the substrate, the coated substrate can, in some embodiments, be dried and calcined. After calcination, a PGM/second component layer, or separate PGM and second component layers can be coated onto the calcined refractory metal oxide layer. Although the PGM/MG composition is generally directly used, in some embodiments, other components as generally described herein may be added thereto prior to coating the slurry onto the coated support.

Emission Treatment System

The present invention also provides an emission treatment system that incorporates the DOC composition or article described herein. The DOC composition of the present invention is typically used in an integrated emissions treatment system comprising one or more additional components for the treatment of diesel exhaust gas emissions. As such, the terms "exhaust stream", "engine exhaust stream", "exhaust gas stream" and the like refer to the engine effluent as well as to the effluent downstream of one or more other catalyst system components as described herein.

For example, the emission treatment system may further comprise a catalyzed soot filter (CSF) component and/or a selective catalytic reduction (SCR) catalytic article. Such optional additional components are typically located downstream from the diesel oxidation catalyst of the invention, although the relative placement of the various components of the emission treatment system can be varied. "Downstream" refers to a position of a component in an exhaust gas stream in a path further away from the engine than the preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relative to another component. The treatment system can include further components, such as ammonia oxidation materials, additional particulate filtration components, $NO_x$ storage and/or trapping components, and reductant injectors. The preceding list of components is merely illustrative and should not be taken as limiting the scope of the invention.

The optional CSF may comprise a substrate coated with a washcoat layer containing one or more catalysts for burning trapped soot and/or oxidizing exhaust gas stream emissions. In general, the soot burning catalyst can be any known catalyst for combustion of soot. In the case of passive soot regeneration, the soot burning catalyst can be an oxidation catalyst comprising one or more platinum metal catalysts (e.g., platinum, palladium, and/or rhodium) to promote NO to $NO_2$ oxidation.

Figure 2:
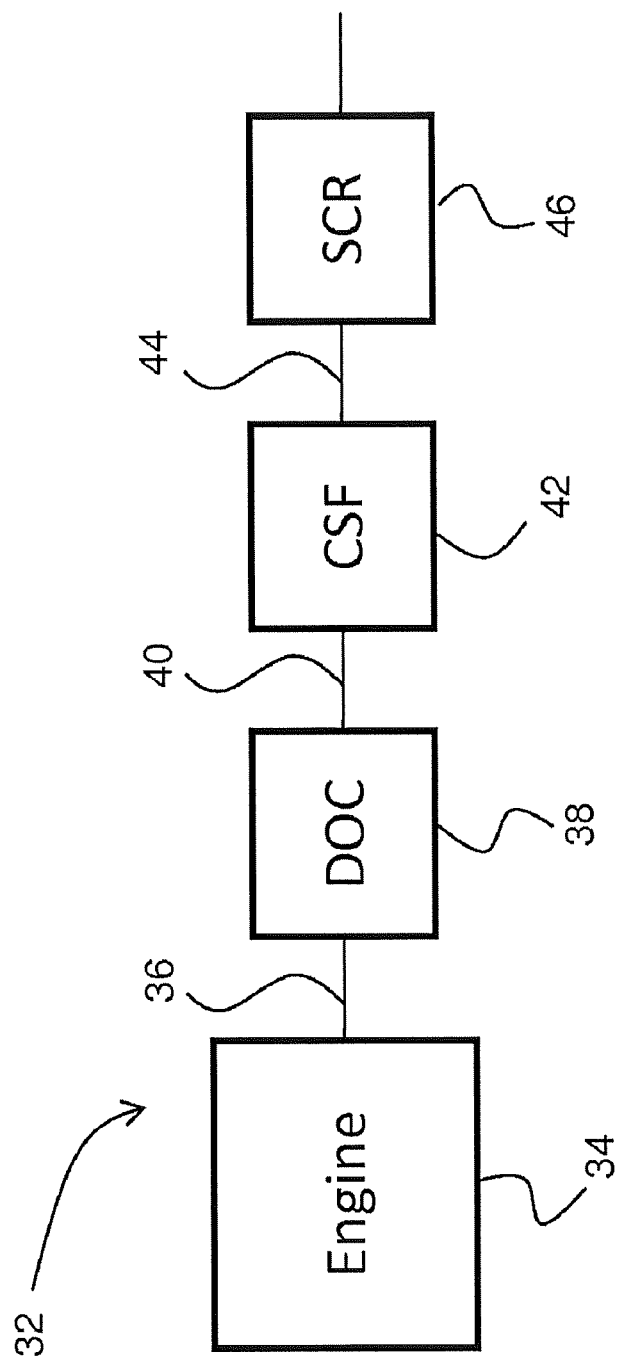
FIG. 2 shows a schematic depiction of an embodiment of an emission treatment system in which a DOC of the present invention is utilized.

One exemplary emissions treatment system is illustrated in FIG. 2, which depicts a schematic representation of an emission treatment system 32. As shown, an exhaust gas stream containing gaseous pollutants and particulate matter is conveyed via exhaust pipe 36 from an engine 34 to a diesel oxidation catalyst (DOC) 38, which is coated with the washcoat composition of the present invention. In the DOC 38, unburned gaseous and non-volatile hydrocarbons (i.e., the SOF) and carbon monoxide are largely combusted to form carbon dioxide and water. In addition, a proportion of the NO of the $NO_x$ component may be oxidized to $NO_2$ in the DOC. The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration. After removal of particulate matter, via CSF 42, the exhaust gas stream is conveyed via exhaust pipe 44 to a downstream selective catalytic reduction (SCR) component 16 for the further treatment and/or conversion of $NO_R$. Note that any or all of the above-noted catalyst components, or other optional catalyst components, could include the catalyst composition of the invention which includes ceria impregnated with a Pd component and a second component comprising at least one of Mg, Rh, and Pt.

EXPERIMENTAL

Aspects of the present invention are more fully illustrated by the following examples, which are set forth to illustrate certain aspects of the present invention and are not to be construed as limiting thereof.

Example 1: Preparation of Alumina Impregnated with Pd

High surface area alumina support having a BET surface area of about 145 to 155 $m^2/g$ and a pore volume between 0.8 to 0.9 cc/g is provided. Using a standard incipient wetness procedure, the alumina is impregnated with a Pd nitrate solution, with a targeted Pd concentration of 2 weight percent, based on the total weight of the impregnated alumina support. The alumina impregnated with Pd is then dried at 120° C. for 1 hour. The dried alumina/Pd mixture is then calcined for 1 hour at 500° C. The calcined sample is cooled in air until it reaches room temperature.

The Pd impregnated alumina powder is mixed with enough deionized water to form a slurry having a targeted solid content of 30 weight percent and the pH of the slurry is reduced to 4 to 4.5 by addition of nitric acid. The slurry is then milled to a particle size with $D_{90}$ less than 15 μm, using a ball mill. The milled slurry is dried by stirring and calcined at 500° C. for 1 hour in air.

Example 2: Preparation of Ceria Impregnated with Pd

High surface area ceria support having a BET surface area of about 140 to 160 m$^2$/g and a pore volume between 0.3 to 0.5 cc/g is provided. Using a standard incipient wetness procedure, the ceria is impregnated with a Pd nitrate solution, with a targeted Pd concentration of 2 weight percent, based on the total weight of the impregnated ceria support. The ceria impregnated with Pd is then dried at 120° C. for 1 hour. The dried ceria/Pd mixture is then calcined for 1 hour at 500° C. The calcined sample is cooled in air until it reaches room temperature.

The Pd impregnated ceria powder is mixed with enough deionized water to form a slurry having a targeted solid content of 30 weight percent and the pH of the slurry is reduced to 4 to 4.5 by addition of nitric acid. The slurry is then milled to a particle size with $D_{90}$ less than 15 μm using a ball mill. The milled slurry is dried by stirring and calcined at 500° C. for 1 hour in air.

Example 3: Comparison of Pd/Alumina and Pd/Ce Light Off Temperatures

Powder samples are prepared according to Examples 1 and 2 above. The resulting Pd/Ce and Pd/alumina powders, after pressing/crushing/sieving into 200-500 μm, were then tested in a powder testing unit.

The light-off temperatures of calcined catalyst powders were measured. Measurement time was a 3 minute equilibration time plus a 30 second sampling time. Measurements were taken at 125° C., 135° C., 150° C., 165° C., 180° C., 195° C., 210° C., 225° C., 250° C., 300° C., and 350° C. The exhaust feed composition was 700 ppm CO, 80 ppm $C_3H_6$ ($C_1$ basis), 340 ppm $C_1$ decane/toluene (2/1 ratio on $C_1$ basis), 70 ppm NO, 10% $O_2$, 10% $CO_2$, and 5% $H_2O$.

The light-off temperatures of aged catalyst powders were also measured under the same parameters as for the fresh catalyst powders. Aging was done in air with 10% steam for 20 hours at 800° C.

Figure 3:
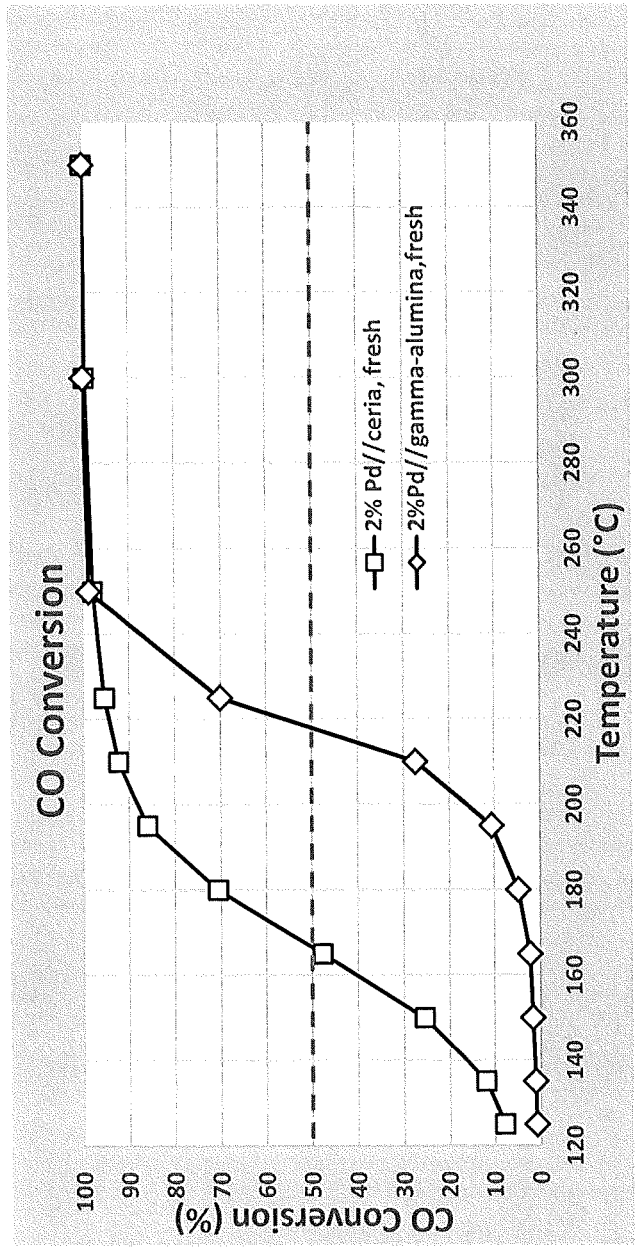
FIG. 3 is a graph comparing CO light-off temperatures for diesel oxidation catalysts comprising alumina impregnated with palladium and diesel oxidation catalysts comprising ceria impregnated with palladium.
Figure 4:
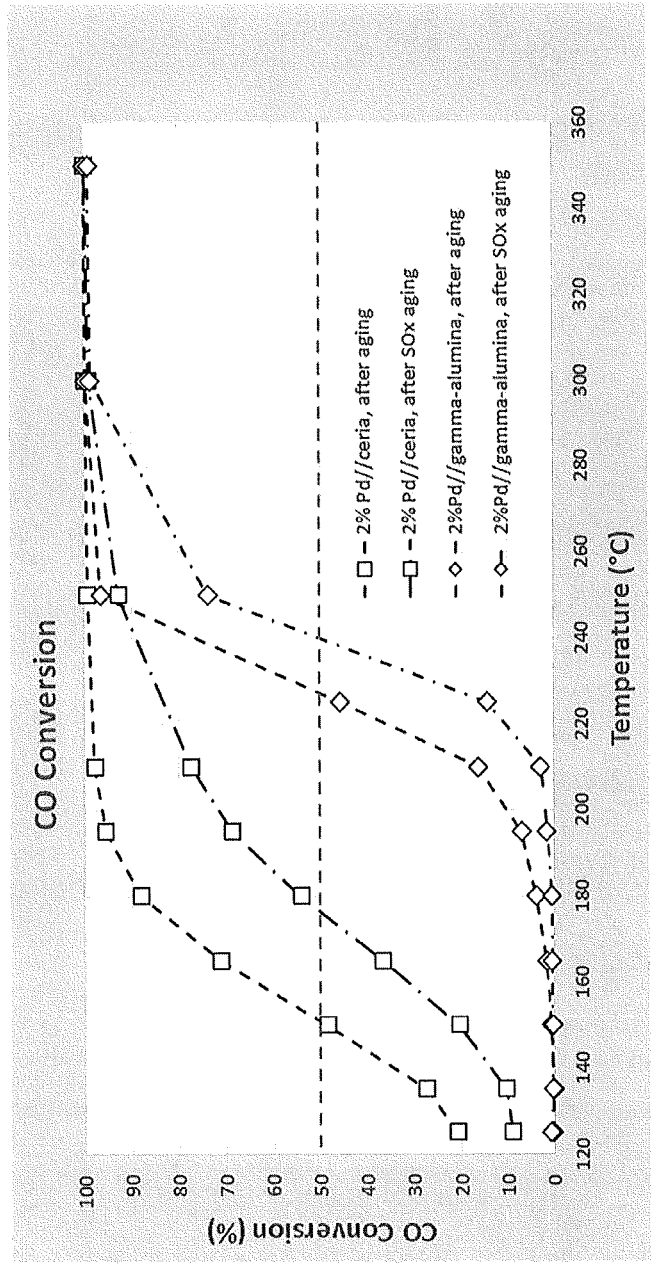
FIG. 4 is a graph comparing CO light-off temperatures for diesel oxidation catalysts comprising alumina impregnated with palladium and diesel oxidation catalysts comprising ceria impregnated with palladium.

FIG. 3 is a graph comparing CO light-off temperatures for diesel oxidation catalysts comprising alumina impregnated with palladium and diesel oxidation catalysts comprising ceria impregnated with palladium. The catalyst powders comprising ceria impregnated with Pd outperforms the catalyst powders comprising alumina impregnated with Pd in CO light-off ($T_{50}$) temperature by more than 50° C. However, as illustrated in FIG. 4, the Pd/ceria sample suffers from sulfur poisoning more than the Pd/alumina sample after aging. Table 1 below summarizes the $T_{50}$ light-off temperatures of each of the fresh and aged samples.

TABLE 1

$T_{50}$ Light-off Temperatures for Fresh and Aged Catalyst Samples

| Sample Description | $T_{50}$-CO |
|---|---|
| 2% Pd//ceria, fresh | 165.0 |
| 2% Pd//ceria, after aging | 151.0 |
| 2% Pd//gamma-alumina, fresh | 219.7 |
| 2% Pd//gamma-alumina, after aging | 228.1 |

Example 4: Preparation of Ceria Impregnated with Pd and Mg Components in Separate Steps In a first step, a measured amount of Mg-Nitrate powder is mixed with enough deionized water (Di-$H_2O$) to soak up the powder and form a Mg/Di-$H_2O$ solution. The Mg/Di-$H_2O$ solution is added dropwise to a measured amount of ceria in powder form while stirring. The targeted Mg concentration is 0.5 weight percent, based on the total weight of the impregnated ceria. The ceria support has a BET surface area of about 140 to 160 m$^2$/g and a pore volume between 0.3 to 0.5 cc/g. The Mg/Di-$H_2O$ solution and ceria powder are mixed well. The mixture is then dried at 120° C. for 4 hours. The dried Mg/Ce mixture is then calcined for 1 hour at 500° C.

In a second step, a measured amount of Pd-Nitrate solution is diluted with an amount of deionized water suitable for incipient wetness impregnation, thereby forming a Pd/Di-$H_2O$ solution. The Pd/Di-$H_2O$ solution is added dropwise to a measured amount of the calcined Ce/Mg mixture from step 1 while stirring. The targeted Pd concentration is 2 weight percent, based on the total weight of the impregnated ceria. The Pd impregnated Ce/Mg powder was then dried at 120° C. for 4 hours. The dried Pd/Mg/Ce mixture is then calcined for 1 hour at 500° C. to form a catalyst composition.

The Pd/Mg/Ce calcined powder is mixed well with deionized water to form a slurry having a solid content of about 30 weight percent. The pH of the slurry is adjusted to about 4.5 to about 5.0 with $HNO_3$ (concentrated $HNO_3$ is diluted 1:1 with deionized water). The slurry is then milled to a particle size with $D_{90}$ less than 15 μm using a ball mill. The mixed slurry is dried by stirring and calcining at 500° C. for 1 hour in air. The resulting Pd/Ce and Pd/Mg/Ce powders, after pressing/crushing/sieving into 200-500 μm, were then tested in a powder testing unit. The light-off temperatures of the calcined catalyst powders were measured.

Example 5: Oxidation Testing for Ceria Impregnated with Pd and a Second Metal Component As illustrated in FIG. 4 and discussed in Example 3 above, the Pd/ceria catalyst sample suffers from sulfur poising more than the Pd/alumina catalyst sample after aging. To enhance the sulfur resistance of the catalyst and still maintain the CO light-off temperature for the Pd/ceria catalyst sample, different dopants were incorporated into the ceria.

For comparison purposes, a number of coated catalyst powders were prepared according to Example 4 above, the catalyst powders comprising ceria impregnated with 2 wt. % palladium and 0.5 wt. % of a dopant selected from the group consisting of magnesium (Mg), praseodymium (Pr), iron (Fe), yttrium (Y), lithium (Li), indium (In), tin (Sn), niobium (Nb), gallium (Ga), zirconium (Zr), iridium (Ir), silver (Ag), neodymium (Nd), tungsten (W), copper (Cu), zinc (Zn), rhodium (Rh), molybdenum (Mo), and cobalt (Co). The catalyst mass was 100 mg per sample.

The light-off temperatures of fresh calcined catalytic powders were measured with a powder testing unit. Measurement time was a 3 minute equilibration time plus a 30 second sampling time. Measurements were taken at 125° C., 135° C., 150° C., 165° C., 180° C., 195° C., 210° C., 225° C., 250° C., 300° C., and 350° C. The exhaust feed composition was 700 ppm CO, 80 ppm $C_3H_6$ ($C_1$ basis), 340 ppm decane/toluene (2/1 ratio, on $C_1$ basis), 70 ppm NO, 10% $O_2$, 10% $CO_2$, and 5% $H_2O$.

The light-off temperatures of aged and regenerated catalyst powders were also measured under the same parameters as for the fresh catalyst powders. In order to test for susceptibility to sulfur poisoning (S-Aging), the catalyst powders were heated at 350° C. for 5 hours in the presence of 9 L/hour of 20 ppm $SO_2$, 100 ppm NO, and 5% $H_2O$ to form sulfated catalyst powders (i.e., S-aged catalyst powders) having approximately 2 g/L of sulfur loading. For regeneration, the sulfated catalyst powders were heated at 600° C. (or 650° C.) for 30 minutes in 10% $H_2O$/air.

The references associated with each dopant tested are listed in Table 2 below.

TABLE 2

Dopants Tested

| DoE ID | Dopant |
|---|---|
| N01 | — |
| N12 | Pr |
| N13 | Fe |
| N14 | Y |
| N15 | Li |
| N16 | In |
| N17 | Sn |
| N18 | Nb |
| N19 | Ga |
| N20 | Mg |
| N21 | Zr |
| N22 | Ir |
| N23 | Ag |
| N24 | Nd |
| N25 | W |
| N26 | Cu |
| N27 | Zn |
| N28 | Rh |
| N29 | Mo |
| N30 | Co |

Figure 5:
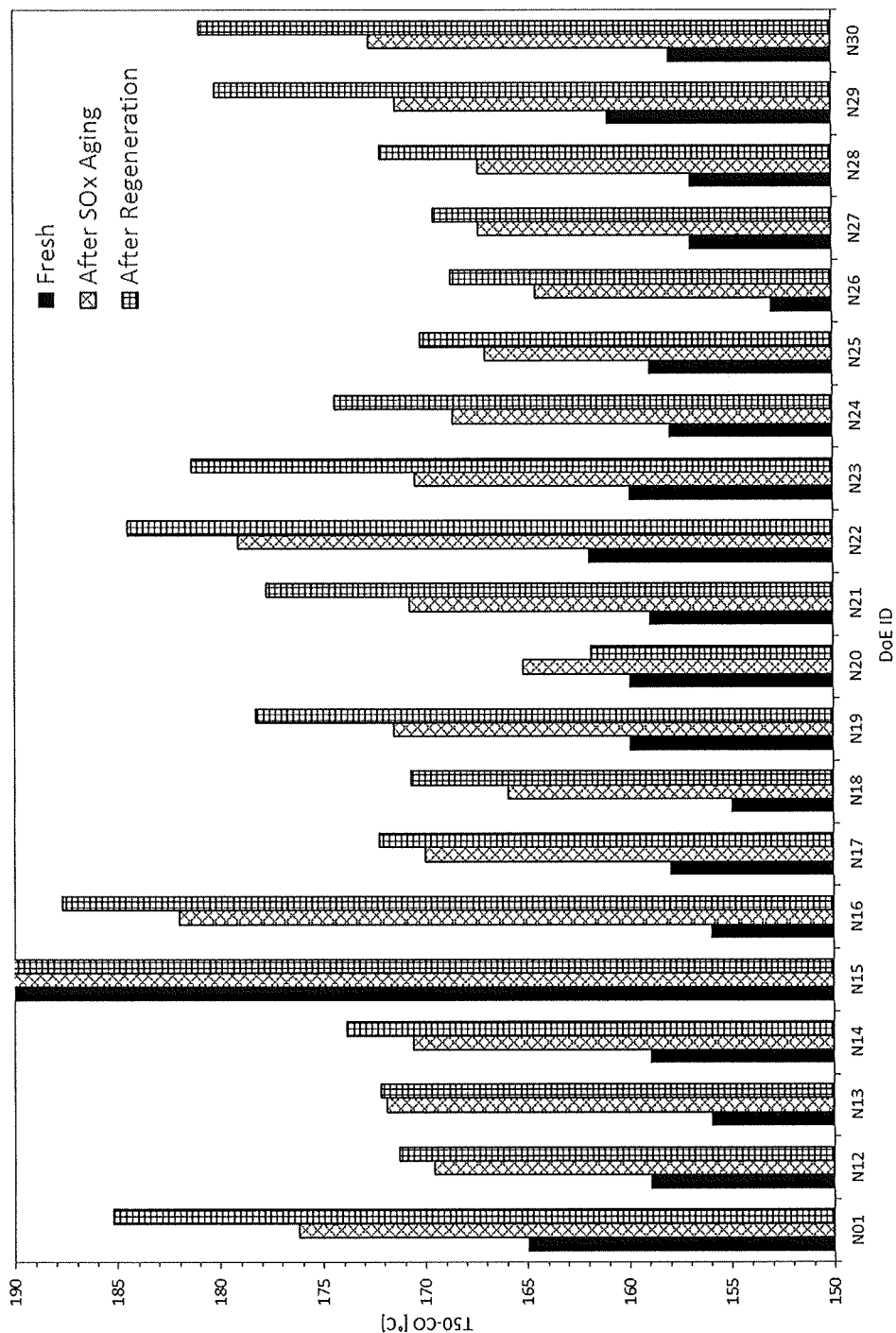
FIG. 5 is a graph illustrating CO light-off temperatures for diesel oxidation catalysts comprising ceria impregnated with 2 weight percent palladium (Pd) and 0.5 weight percent of different dopants.

FIG. 5 illustrates the CO light-off temperatures for fresh, $SO_x$ aged, and regenerated catalyst powders comprising ceria impregnated with 2 wt. % Pd and 0.5 wt. % dopant. For the fresh catalyst powders, all samples showed lower CO light-off temperatures compared to reference N01 (no dopant), with the exception of the Li doped sample. The Mg doped sample showed a good CO light-off temperature after $SO_x$ aging and it was the only catalyst that showed a lower light-off temperature after the lean regeneration at 600° C., as compared to the fresh N01 reference sample (before sulfur exposure). Other promising dopants with improved CO light-off temperatures after $SO_x$ aging include Cu (N26), Zn (N27), Nb (N18), and Rh (N28).

Figure 6:
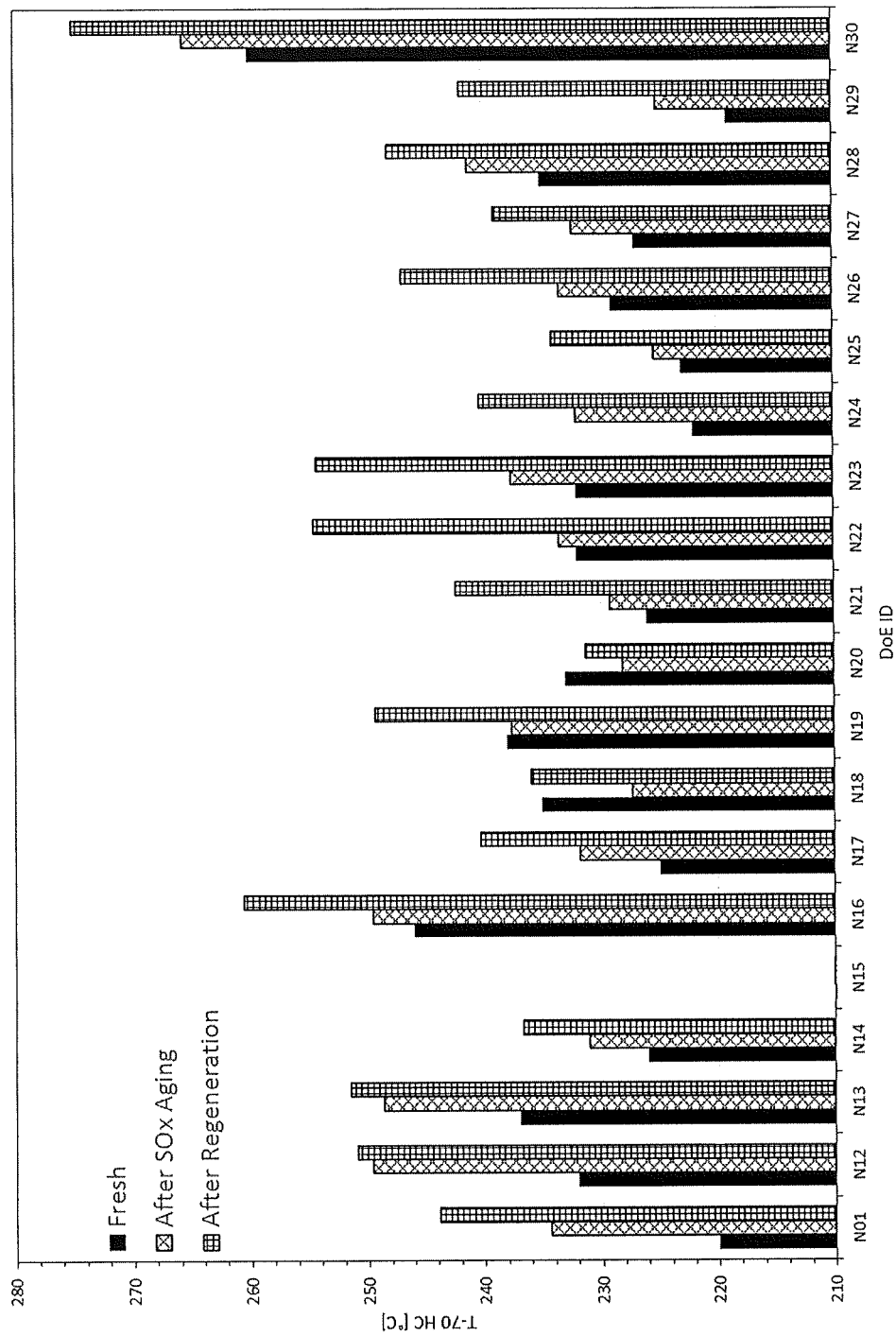
FIG. 6 is a graph illustrating HC light-off temperatures for diesel oxidation catalysts comprising ceria impregnated with 2 weight percent palladium (Pd) and 0.5 weight percent of different dopants.

FIG. 6 illustrates the HC light-off temperatures for fresh, $SO_x$ aged, and regenerated catalyst powders comprising ceria impregnated with 2 wt. % Pd and 0.5 wt. % dopant. For the fresh catalytic articles, all samples showed higher HC light-off temperatures compared to reference N01 (no dopant), with the exception of the Mo doped sample (N29). The Li doped sample (N15) did not reach 70% HC conversion up to 350° C. and was therefore not included in the graph. After $SO_x$ aging, several samples showed better HC light-off performance than the reference N01 sample. The best HC performance was achieved for the Mg doped catalyst (N20), which also provided the lowest CO light-off temperature after $SO_x$ aging.

Example 6: Comparison of Pd/Ceria Catalyst Powders with and without Magnesium

To enhance the sulfur resistance of the Pd/ceria catalyst and still maintain the CO light-off temperature for the Pd/ceria catalyst sample, Mg was incorporated into the ceria using the process described in Example 4 above. The CO light-off temperatures of fresh, S-aged and regenerated catalyst samples were measured using the testing conditions described in Example 5 above.

Figure 7:
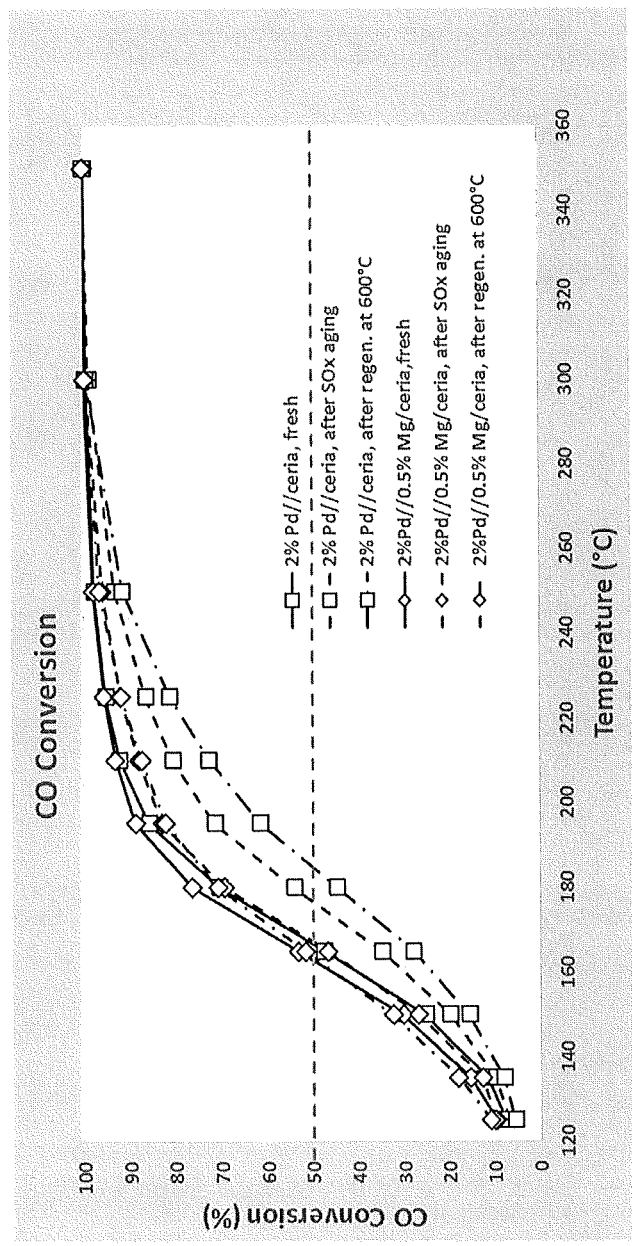
FIG. 7 is a graph comparing the CO light-off temperatures of Pd/ceria catalyst powders and Pd/Mg/ceria catalyst powders.
Figure 8:
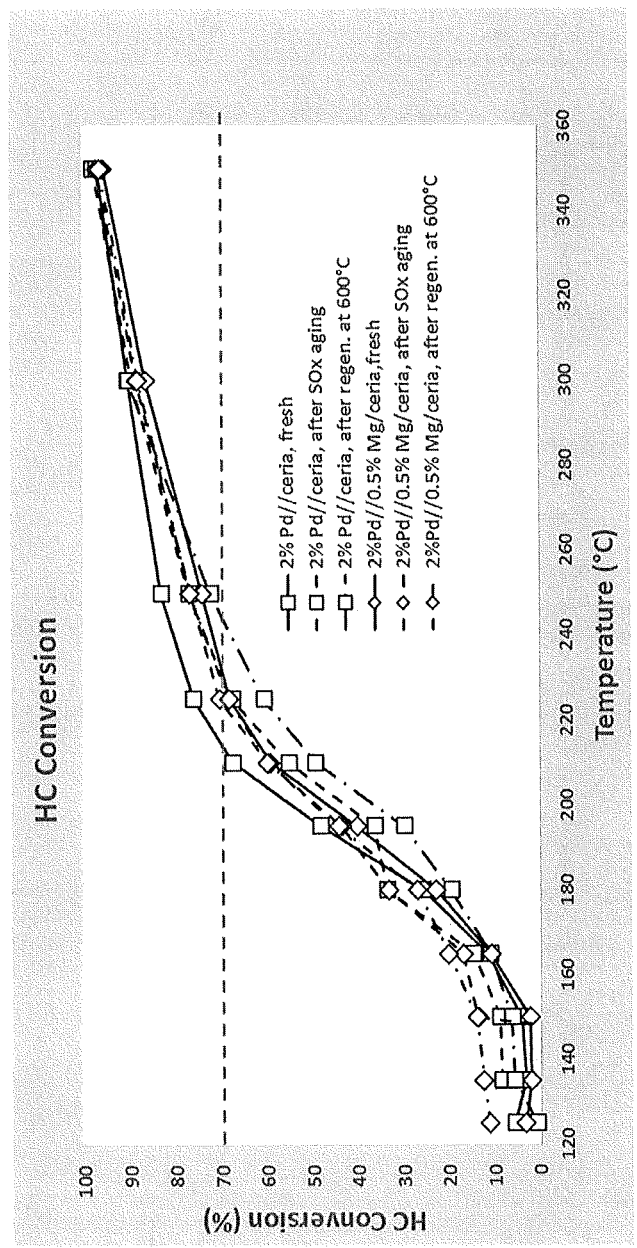
FIG. 8 is a graph comparing the HC light-off temperatures of Pd/ceria catalyst powders and Pd/Mg/ceria catalyst powders.

FIG. 7 is a graph comparing the CO light-off temperatures of Pd/ceria catalyst powders and Pd/Mg/ceria catalyst powders. FIG. 8 is a graph comparing the HC light-off temperatures of Pd/ceria catalytic articles and Pd/Mg/ceria catalyst powders. The light-off temperatures of the various samples are summarized in Table 3 below.

TABLE 3

CO $T_{50}$ Light-off Temperatures and $T_{70}$ HC Light-off Temperatures for Fresh, Aged, and Regenerated Catalyst Samples

| Sample Description | T50-CO | T70-HC |
|---|---|---|
| 2% Pd//ceria, fresh | 165.0 | 213 |
| 2% Pd//ceria, after SOx aging | 176.2 | 227 |
| 2% Pd//ceria, after regen. at 600° C. | 185.2 | 244 |
| 2% Pd//0.5% Mg/ceria, fresh | 160.0 | 230 |
| 2% Pd//0.5% Mg/ceria, after SOx aging | 165.2 | 225 |
| 2% Pd//0.5% Mg/ceria, after regen. at 600° C. | 161.8 | 229 |

As illustrated in FIGS. 7 and 8 and summarized in Table 3, catalyst samples with Mg impregnated in the ceria offered improvements in sulfur resistance over the Pd/ceria reference sample (prepared according to Example 2 above). Mg reduces sulfur poisoning for CO light-off temperatures as well as for HC light-off temperatures.

Example 7: Mg Loading Study Using a Ceria Support

Without being limited by theory, the sulfur resistance enhancement provided by Mg, as shown in Example 6 above, can potentially be explained in two ways: Mg protects Pd from sulfur, or Mg changes ceria to make it less susceptible to sulfur. To ascertain which theory is more probable, an Mg-loading study was conducted for various levels of Mg loading. The same process described in Example 5 above is used to impregnate ceria with Pd and Mg, however, the targeted Mg loading is varied from 0.1, 0.5, 1, to 2 weight percent, corresponding to a Pd/Mg mole ratio of roughly 6:1, 6:5, 6:10, and 6:20, respectively.

Figure 9:
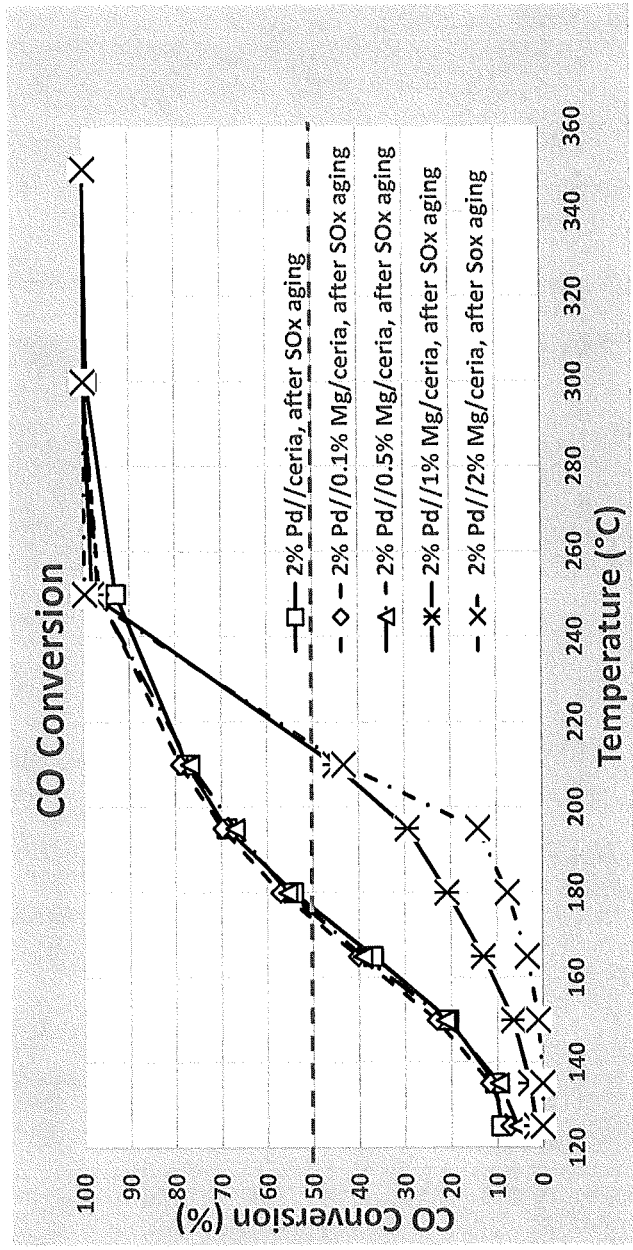
FIG. 9 is a graph showing CO light-off temperatures for different loading levels of Mg in ceria.

FIG. 9 is a graph showing CO light-off temperatures for different loading levels of Mg. The results show that CO light-off temperature suffers at a Pd/Mg molar ratio less than about 1:1, indicating that Mg primarily functions to protect Pd from sulfur.

Example 8: Comparison of Pd/Ceria, Pd/(Mg+Ceria), and (Pd+Mg)/Ceria Light-Off Temperatures Following the catalyst powder sample testing, honeycomb substrates, as used in commercial vehicles, were coated with various catalyst samples and tested. Three core samples were prepared. An incipient wetness impregnation procedure was used to prepare each sample as follows.

Sample a (Pd/Ceria):

A measured amount of Pd-Nitrate solution is diluted with enough deionized water to form a Pd/Di-$H_2O$ solution. The Pd/Di-$H_2O$ solution is added dropwise to a measured amount of ceria in powder form while stirring. The targeted Pd concentration is 2.0 weight percent, based on the total weight of the impregnated ceria. The ceria support has a BET surface area of about 140 to 160 $m^2/g$ and a pore volume between 0.3 to 0.5 cc/g. The Pd/Di-$H_2O$ solution and ceria powder are mixed well. The mixture is then dried at 120° C. for 4 hours. The dried Pd/Ce mixture is then calcined for 1 hour at 500° C.

The Pd/Ce calcined powder is mixed well with deionized water to form a slurry having a solid content of about 30 weight percent. The pH of the slurry is adjusted to about 4.5 to about 5.0 with $HNO_3$ (concentrated $HNO_3$ is diluted 1:1 with deionized water). The slurry is then milled to a particle size with $D_{90}$ less than 15 μm using a ball mill Alumina binder is added to the slurry and mixed well.

Once the catalytic slurry is prepared, a substrate is coated with the slurry. A 1 inch diameter by 3 inch length core is cut from a ceramic substrate. The substrate has 400 cells per square inch. The entire ceramic core is submerged into the slurry until no air bubbles remain in the substrate channels. The core is then removed from the slurry and shaken to remove excess slurry out of the core. An air knife can be used to blow remaining excess slurry out of the channels until all are clear and the core is at the desired weight (determined by solids concentration of the slurry and $H_2O$ adsorption by the substrate). The core is then dried until no moisture remains. The dried core is then calcined at 500° C. for one hour. This coating process can be repeated as necessary to achieve the desired loading layer.

Sample B (Pd/(Mg+Ceria)):

In a first step, a measured amount of Mg-Nitrate powder is mixed with enough deionized water to soak up the powder and form an Mg/Di-$H_2O$ solution. The Mg/Di-$H_2O$ solution is added dropwise to a measured amount of ceria in powder form while stirring. The targeted Mg concentration is 0.5 weight percent, based on the total weight of the impregnated ceria. The ceria support has a BET surface area of about 140 to 160 $m^2/g$ and a pore volume between 0.3 to 0.5 cc/g. The Mg/Di-$H_2O$ solution and ceria powder are mixed well. The mixture is then dried at 120° C. for 4 hours. The dried Mg/Ce mixture is then calcined for 1 hour at 500° C.

In a second step, a measured amount of Pd-Nitrate solution is diluted with deionized water to form a Pd/Di-$H_2O$ solution. The Pd/Di-$H_2O$ solution is added dropwise to a measured amount of the calcined Mg/Ce mixture from step 1 while stirring. The targeted Pd concentration is 2 weight percent, based on the total weight of the impregnated ceria. The Pd/Di-$H_2O$ solution and calcined Mg/Ce powder are mixed well. The mixture is then dried at 120° C. for 4 hours. The dried Pd/Mg/Ce mixture is then calcined for 1 hour at 500° C. to form a catalyst composition.

The Pd/Mg/Ce calcined powder is mixed well with deionized water to form a slurry having a solid content of about 30 weight percent. The pH of the slurry is adjusted to about 4.5 to about 5.0 with $HNO_3$ (concentrated $HNO_3$ is diluted 1:1 with deionized water). The slurry is then milled to a particle size with $D_{90}$ less than 15 μm using a ball mill Alumina binder is added to the slurry and mixed well.

Once the catalytic slurry is prepared, a substrate is coated with the slurry. A 1 inch diameter by 3 inch length core is cut from a ceramic substrate. The substrate has 400 cells per square inch. The entire ceramic core is submerged into the slurry until no air bubbles remain in the substrate channels. The core is then removed from the slurry and shaken to remove excess slurry out of the core. An air knife can be used to blow remaining excess slurry out of the channels until all are clear and the core is at the desired weight (determined by solids concentration of the slurry and $H_2O$ adsorption by the substrate). The core is then dried until no moisture remains. The dried core is then calcined at 500° C. for one hour. This coating process can be repeated as necessary to achieve the desired loading layer.

Sample C ((Pd+Mg)/Ceria)

A measured amount of Mg-Nitrate powder is mixed with enough deionized water to soak up the powder and form a Mg/Di-$H_2O$ solution. A measured amount of Pd-Nitrate solution is added to the Mg/Di-$H_2O$ solution to form a Pd/Mg/Di $H_2O$ solution. The Pd/Mg/Di-$H_2O$ solution is added dropwise to a measured amount of ceria in powder form while stirring. The targeted Mg concentration is 0.5 weight percent and the targeted Pd concentration is 2 weight percent, based on the total weight of the impregnated ceria. The ceria support has a BET surface area of about 140 to 160 $m^2/g$ and a pore volume between 0.3 to 0.5 cc/g. The Pd/Mg/Di-$H_2O$ solution and ceria powder are mixed well. The mixture is then dried at 120° C. for 4 hours. The dried Pd/Mg/Ce mixture is then calcined for 1 hour at 500° C. to form a catalyst composition.

The Pd/Mg/Ce calcined powder is mixed well with deionized water to form a slurry having a solid content of about 30 weight percent. The pH of the slurry is adjusted to about 4.5 to about 5.0 with $HNO_3$ (concentrated $HNO_3$ is diluted 1:1 with deionized water). The slurry is then milled to a particle size with $D_{90}$ less than 15 μm using a ball mill Alumina binder is added to the slurry and mixed well.

Once the catalytic slurry is prepared, a substrate is coated with the slurry. A 1 inch diameter by 3 inch length core is cut from a ceramic substrate. The substrate has 400 cells per square inch. The entire ceramic core is submerged into the slurry until no air bubbles remain in the substrate channels. The core is then removed from the slurry and shaken to remove excess slurry out of the core. An air knife can be used to blow remaining excess slurry out of the channels until all are clear and the core is at the desired weight (determined by solids concentration of the slurry and $H_2O$ adsorption by the substrate). The core is then dried until no moisture remains. The dried core is then calcined at 500° C. for one hour. This coating process can be repeated as necessary to achieve the desired loading layer.

Testing

Cores coated with fresh and aged catalyst samples A, B, and C were tested in a reactor. All aging was done in a tube furnace at 800° C. for 16 hours, under an atmosphere of 10% $H_2O$, 10% $O_2$, and a balance of $N_2$. Activity measurement in light-off performance was conducted with a feed gas composition of 1500 ppm CO, 100 ppm NO, 10% $H_2O$, 4.6% $CO_2$, 14% $O_2$, 40 ppm $C_3H_6$, 30 ppm $CH_4$, 294 ppm (liquid HC's, 36% Toluene/64% Decane) ($C_1$ basis).

Figure 10:
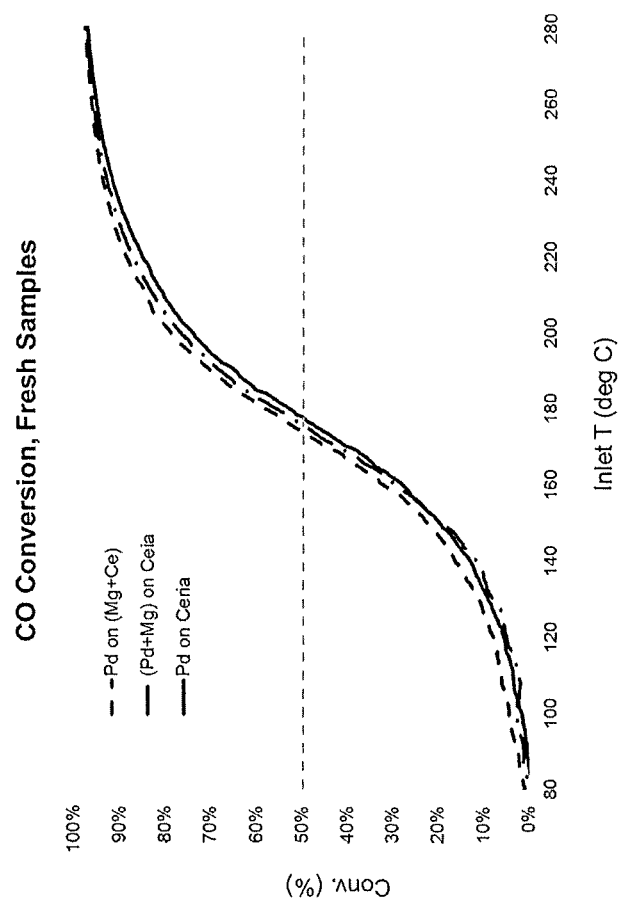
FIG. 10 is a graph illustrating CO light-off temperatures for fresh samples of several catalysts of the present invention.
Figure 11:
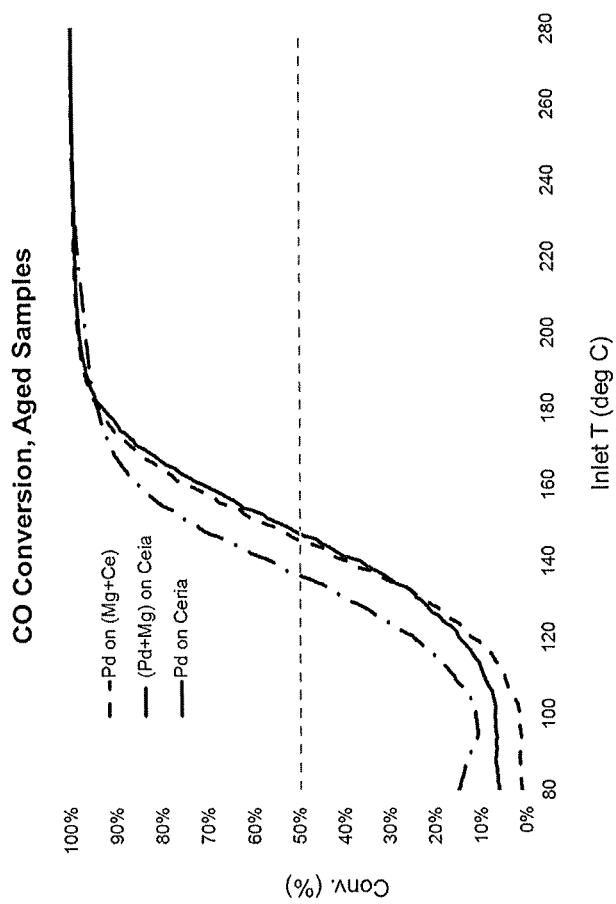
FIG. 11 is a graph illustrating CO light-off temperatures for aged samples of several catalysts of the present invention.

FIG. 10 is a graph illustrating CO light-off temperatures for fresh samples of catalysts A, B, and C. FIG. 11 is a graph illustrating CO light-off temperatures for aged samples of catalysts A, B, and C. Sample C, mixing Pd and Mg first before impregnating the ceria, offered the best CO light-off performance after aging.

Example 9: Comparison of Additional Components Useful for Minimizing Sulfur Poisoning Catalyst samples are prepared as described in Example 4 above, however, Mg is replaced with rhodium (Rh) or platinum (Pt).

Figure 12:
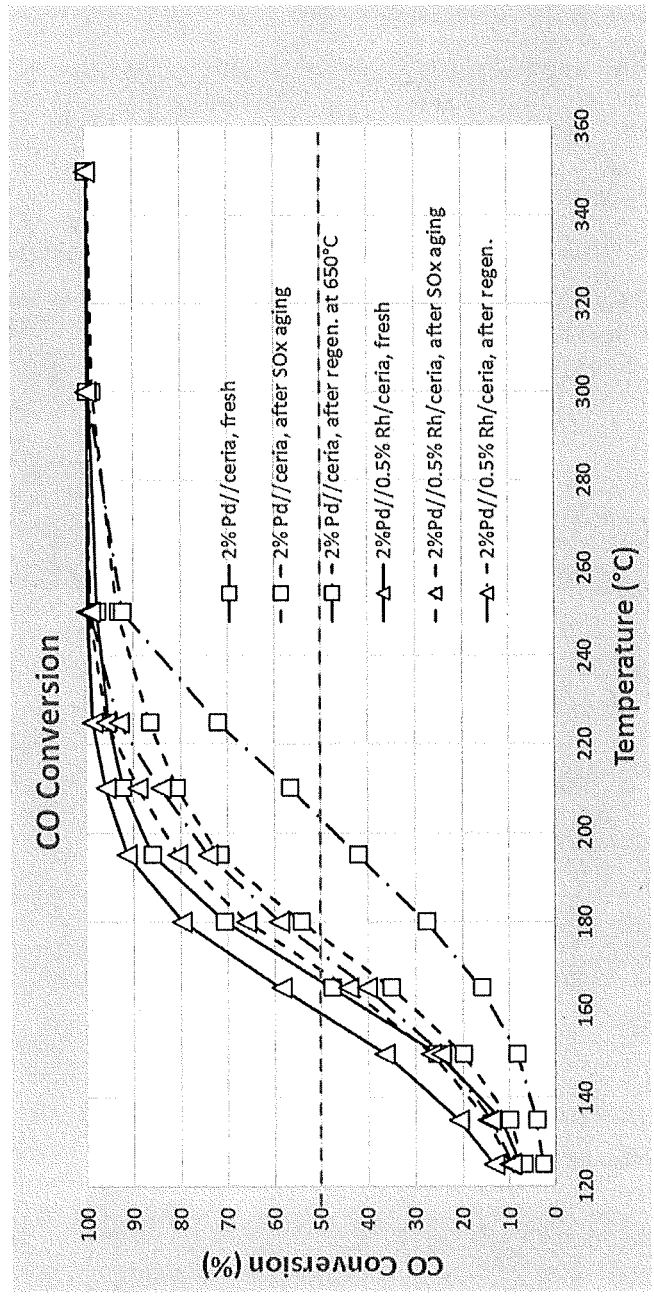
FIG. 12 is a graph illustrating CO light-off temperatures for fresh and S-aged catalyst samples comprising Rh.

FIG. 12 is a graph illustrating CO light-off temperatures for fresh, S-aged and regenerated catalyst samples comprising Rh and fresh, S-aged and regenerated Pd/ceria catalyst samples without Rh. Rh, like Mg, minimizes sulfur poisoning on the ceria impregnated with palladium.

Figure 13:
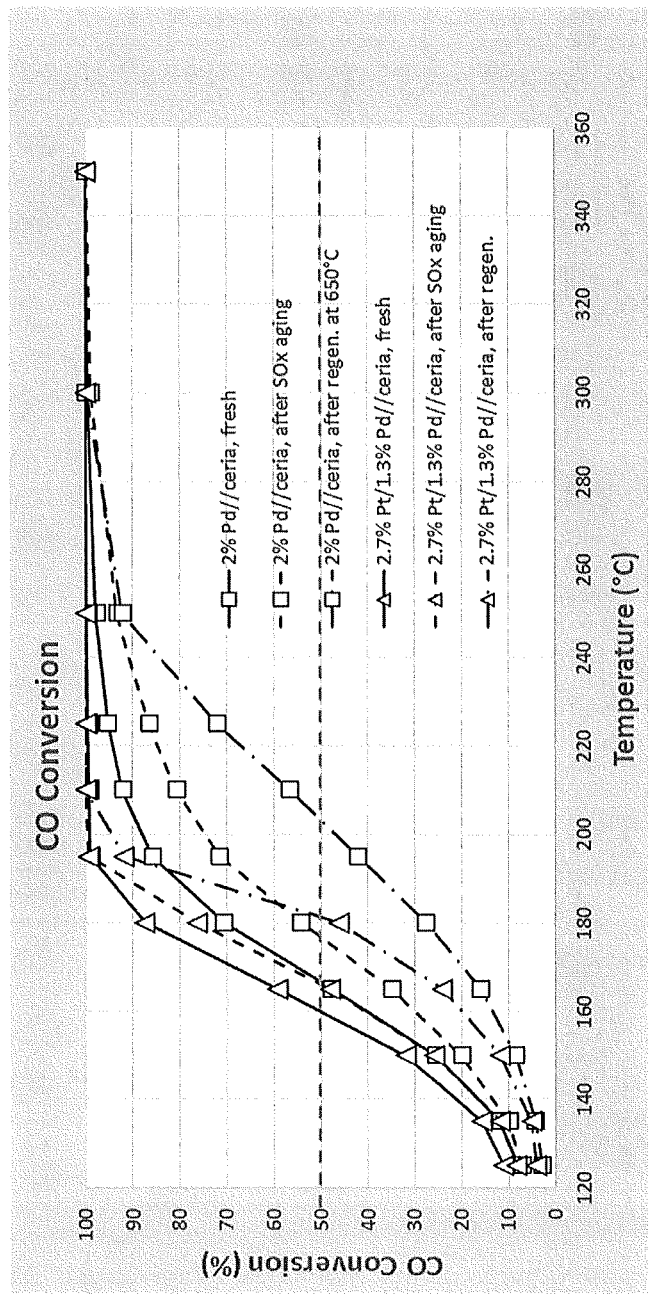
FIG. 13 is a graph illustrating CO light-off temperatures for fresh and S-aged catalyst samples comprising Pt.

FIG. 13 is a graph illustrating CO light-off temperatures for fresh, S-aged and regenerated catalyst samples comprising Pt and fresh, S-aged and regenerated Pd/ceria catalyst samples without Pt. Pt, like Mg, minimizes sulfur poisoning on the ceria impregnated with palladium.

Figure 14:
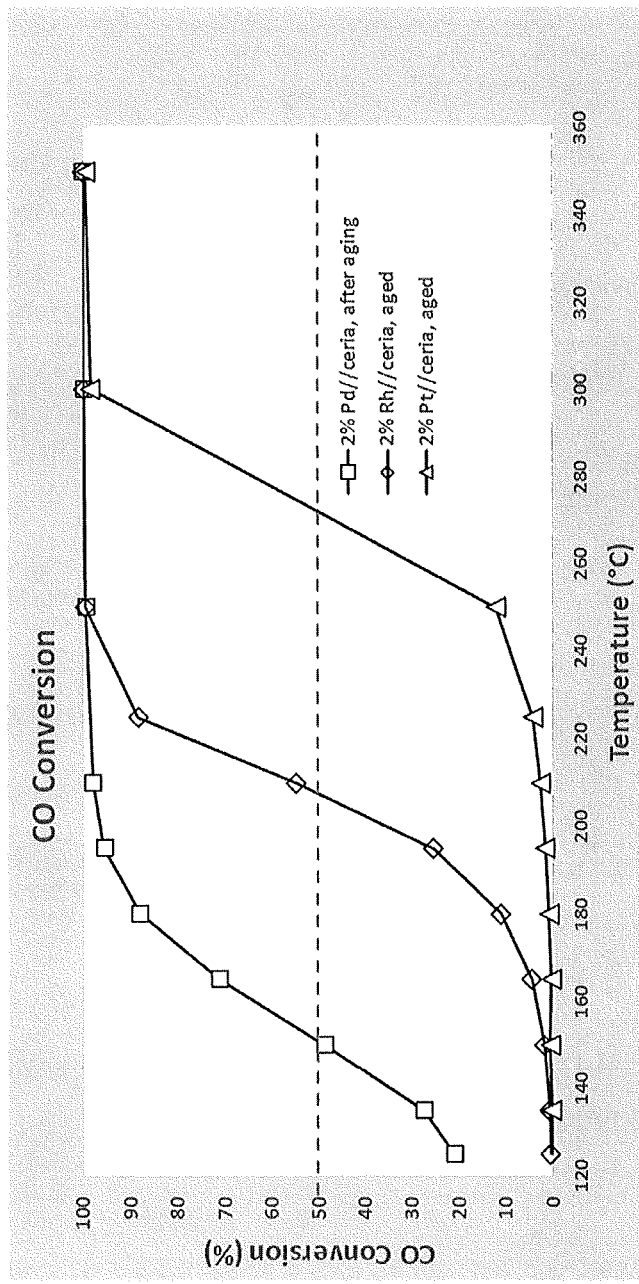
FIG. 14 is a graph comparing CO light-off temperatures for hydrothermally aged Pd/ceria, Rh/ceria, and Pt/ceria catalyst samples.

Example 10: Comparison of Catalysts Comprising Ceria Impregnated with Different PGMs To ascertain that both Rh and Pt have synergism with Pd, not with ceria, catalyst powders with Rh/Ce and Pt/Ce were prepared. Catalyst samples were prepared as described in Example 4 above, however, Pd is replaced with rhodium (Rh) or platinum (Pt). FIG. 14 is a graph comparing CO light-off temperatures for hydrothermally aged Pd/ceria, Rh/ceria, and Pt/ceria catalyst samples. Pt/ceria is not as good of a CO oxidation catalyst as Pd/ceria. However, as illustrated in FIG. 13 and Example 9 above, ceria impregnated with the combination of Pt and Pd has better CO oxidation activity than ceria impregnated with Pd alone.

Example 11: Comparison of Additional Components Useful for Improving CO Light-Off Temperatures Catalyst samples were prepared as described in Example 4 above, however, Mg is replaced with platinum (Pt). A second catalyst sample was prepared as described in Example 4 above, however, Mg is replaced with manganese (Mn) and palladium is mixed with platinum before being used to impregnate the ceria support comprising Mn.

Figure 15:
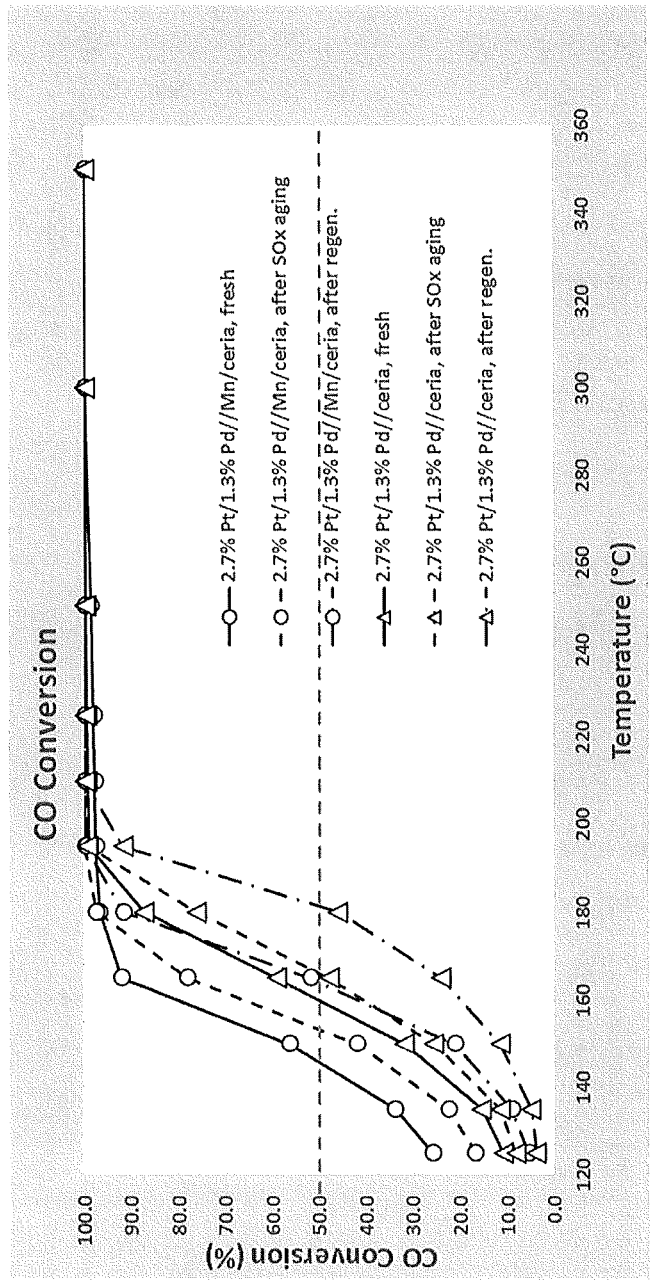
FIG. 15 is a graph illustrating CO light-off temperatures for fresh, S-aged and regenerated Pd/Pt/ceria catalyst samples and Pd/Pt/(Mn+ceria) catalyst samples.

FIG. 15 is a graph illustrating CO light-off temperatures for fresh, S-aged and regenerated Pd/Pt/ceria catalyst samples and Pd/Pt/(Mn+Ce) catalyst samples. Activity results indicate that ceria impregnated with manganese can improve CO light-off temperature performance.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed is:

1. An oxidation catalyst composite for abatement of exhaust gas emissions from a lean burn engine, the catalyst composite comprising:
   a carrier substrate having a length, an inlet end and an outlet end; and
   an oxidation catalyst material coated on the carrier substrate;
   wherein the oxidation catalyst material comprises a first layer and a second layer;
   wherein the first layer comprises a first oxygen storage component impregnated by a palladium (Pd) component and by a second component comprising magnesium (Mg), wherein palladium and magnesium are impregnated in the first oxygen storage component in a mole ratio of Pd to Mg in a range of about 1:0 to about 1:2; and
   wherein the second layer comprises a refractory metal oxide component impregnated by platinum (Pt) and palladium (Pd), wherein the ratio of Pt to Pd is in the range of about 1:10 to about 10:1.

2. The oxidation catalyst composite of claim 1, wherein at least one of the following conditions is met:
   (i) the first layer is an under layer coated on the carrier substrate, and the second layer is an upper layer coated on at least part of the first layer;
   (ii) the second layer is an under layer coated on the carrier substrate, and the first layer is an upper layer coated on at least part of the second layer;
   (iii) the first oxygen storage component and the refractory metal oxide component are mixed and in the form of a blended layer coated on the carrier substrate;
   (iv) wherein the first layer is an under layer coated on the carrier substrate, and the first layer is coated only on a zone of the carrier substrate.

3. The oxidation catalyst composite of claim 1, wherein the first layer is an under layer coated on the carrier substrate, and the second layer is an upper layer coated only on a zone of the first layer.

4. The oxidation catalyst composite of claim 3, wherein at least one of the following conditions is met:
   (i) the first layer is coated on the entire length of the substrate, and wherein the second layer is only coated on the first layer at the outlet end of the substrate;
   (ii) the first layer is coated on the entire length of the substrate, and wherein the second layer is only coated on the first layer at the inlet end of the substrate.

5. The oxidation catalyst composite of claim 1, wherein the first oxygen storage component comprises ceria in an amount in the range of about 0.1 to about 100 weight percent, based on the total weight of the oxygen storage component before being impregnated.

6. The oxidation catalyst composite of claim 1, wherein at least one of the following conditions is met:
   (i) the refractory metal oxide component is selected from the group consisting of alumina, silica, zirconia, titania, ceria, manganese, and combinations thereof;
   (ii) the refractory metal oxide component comprises alumina;
   (iii) the refractory metal oxide component comprises a hydrothermally stable zeolite selected from the group consisting of ZSM-5, beta, mordenite, Y-zeolite, a CHA framework type zeolite, ferrierite, and combinations thereof.

7. The oxidation catalyst composite of claim 1, wherein at least one of the following conditions is met:
   (i) the palladium component impregnated in the first oxygen storage component is present in an amount in the range of about 1 g/ft$^3$ to 200 g/ft$^3$;
   (ii) the palladium and the platinum impregnated in the refractory metal oxide component are present in an amount in the range of about 1 g/ft$^3$ to 200 g/ft$^3$.

8. The oxidation catalyst composite of claim 1, wherein one or more of the first oxygen storage component and the refractory metal oxide component is impregnated by manganese in an amount in the range of about 0.1 to 25 wt. %, based on the total weight of the component impregnated by manganese.

9. The oxidation catalyst composite of claim 1, wherein magnesium is present in an amount in the range of about 0.1 to about 5 weight percent, based on the total weight of the impregnated first oxygen storage component.

10. The oxidation catalyst composite of claim 1, wherein the second component further comprises rhodium, and wherein the rhodium is present in an amount in the range of about 1 g/ft$^3$ to about 200 g/ft$^3$.

11. The oxidation catalyst composite of claim 10, wherein palladium and rhodium are impregnated in the first oxygen storage component in a mole ratio of Pd to Rh in a range of about 1:10 to about 10:1.

12. The oxidation catalyst composite of claim 1, wherein the second component further comprises platinum, and wherein the platinum is present in an amount in the range of about 1 g/ft$^3$ to about 200 g/ft$^3$.

13. The oxidation catalyst composite of claim 12, wherein the first oxygen storage component is further impregnated with platinum (Pt) and palladium and platinum are impregnated in the first oxygen storage component in a mole ratio of Pd to Pt in a range of about 1:10 to about 10:1.

14. The oxidation catalyst composite of claim 1, wherein the first oxygen storage component is further impregnated with a metal selected from the group consisting of praseodymium (Pr), iron (Fe), yttrium (Y), lithium (Li), indium (In), tin (Sn), niobium (Nb), gallium (Ga), zirconium (Zr), iridium (Ir), silver (Ag), neodymium (Nd), tungsten (W), copper (Cu), zinc (Zn), molybdenum (Mo), cobalt (Co), and combinations thereof.

15. The oxidation catalyst composite of claim 1, wherein the second component further comprises platinum, and wherein the first oxygen storage component is further impregnated with a manganese component in the amount of about 0.1 to about 10 weight percent, based on the total weight of the impregnated first oxygen storage component.

16. The oxidation catalyst composite of claim 1, wherein the refractory metal oxide component further comprises barium oxide in an amount in the range of about 3 to about 100 g/ft$^3$.

17. The oxidation catalyst composite of claim 1, wherein the carrier substrate is selected from a flow-through monolith, a wall-flow monolith, a foam, and a mesh.

18. An emission treatment system for treatment of an exhaust gas stream, the emission treatment system comprising:
a diesel engine producing an exhaust gas stream; and
an oxidation catalyst composite according to claim 1 positioned in fluid communication with the exhaust gas stream and adapted for oxidation of carbon monoxide and hydrocarbon gases within the exhaust stream to form a treated exhaust gas stream.

19. The system of claim 18, further comprising a catalyzed soot filter and an SCR catalyst situated downstream from the catalyst composite.

20. The system of claim 19, wherein at least one of the following conditions is met:
(i) the SCR catalyst is present as a washcoat on the catalyzed soot filter;
(ii) the SCR catalyst is a flow through monolith situated downstream from the catalyst composite, and wherein the catalyzed soot filter is situated downstream from the SCR catalyst;
(iii) the SCR catalyst comprises a molecular sieve having a double six ring (d6r) unit;
(iv) the SCR catalyst is selected from a CHA, AEI, and AFX framework type zeolite;
(v) the SCR catalyst comprises a molecular sieve promoted with a metal selected from Cu, Fe, Co, Ni, La, Ce, Mn, V, Ag, and combinations thereof.

21. A method of treating an exhaust stream from a diesel engine, comprising passing the exhaust stream through the oxidation catalyst composite of claim 1 such that NO is oxidized within the catalyst.

22. The method of claim 21, further comprising passing the exhaust stream through an SCR catalyst situated downstream from the oxidation catalyst composite.

23. The method of claim 22, wherein the SCR catalyst is disposed on a wall flow filter monolith.

24. A catalyst article for abatement of exhaust gas emissions from an engine, comprising:
a substrate carrier having a plurality of channels adapted for gas flow, wherein a catalyst composition is positioned to contact an exhaust gas passing through each channel,
wherein the catalyst composition comprises a porous oxygen storage component impregnated with a palladium (Pd) component and by a second component comprising magnesium (Mg) and wherein palladium and magnesium are impregnated in the first oxygen storage component in a mole ratio of Pd to Mg in a range of about 1:0 to about 1:2.

25. The catalyst article of claim 24, wherein at least one of the following conditions is met:
(i) the oxygen storage component is a rare earth metal oxide, optionally stabilized with a refractory metal oxide;
(ii) the oxygen storage component comprises ceria and wherein ceria is present in an amount in the range of about 0.1 to about 100 weight percent, based on the total weight of the oxygen storage component before being impregnated;
(iii) the Pd component is present in amount of about 1-10% by weight, based on the total weight of impregnated oxygen storage component.

26. The catalyst article of claim 24, wherein at least one of the following conditions is met:
(i) the Mg component is present in amount of no more than about 0.5% by weight, based on the total weight of the impregnated oxygen storage component;
(ii) the Mg component is present in amount of about 0.1 to about 0.5% by weight, based on the total weight of impregnated oxygen storage component.

27. The catalyst article of claim 26, wherein the oxygen storage component is further impregnated with a rhodium (Rh) component.

28. The catalyst article of claim 24, further comprising a second porous oxygen storage component impregnated with a rhodium (Rh) component.

29. The catalyst article of claim 24, wherein the catalyst composition comprises a first layer and a second layer, wherein the first layer comprises the porous oxygen storage component impregnated with the palladium (Pd) component and the second component, and wherein the second layer comprises a second porous oxygen storage component impregnated with a rhodium (Rh) component.

30. The catalyst article of claim 24, further comprising a metal impregnated within the oxygen storage component, the metal selected from the group consisting of praseodymium (Pr), iron (Fe), yttrium (Y), lithium (Li), indium (In), tin (Sn), niobium (Nb), gallium (Ga), zirconium (Zr), iridium (Ir), silver (Ag), neodymium (Nd), tungsten (W), copper (Cu), zinc (Zn), molybdenum (Mo), cobalt (Co), and combinations thereof.

\* \* \* \* \*